(12) United States Patent
Cannon et al.

(10) Patent No.: US 6,881,348 B2
(45) Date of Patent: Apr. 19, 2005

(54) METHOD FOR PERCHLORATE REMOVAL FROM GROUND WATER

(75) Inventors: Fred S. Cannon, State College, PA (US); Robert B. Parette, Furnace, PA (US); Chongzheng Na, Ann Arbor, MI (US); Weifang Chen, State College, PA (US); Benjamin Hagerup, Northumberland, PA (US)

(73) Assignee: The Penn State Research Foundation, University Park, PA (US)

(*) Notice: Subject to any disclaimer, the term of this patent is extended or adjusted under 35 U.S.C. 154(b) by 215 days.

(21) Appl. No.: 10/164,843

(22) Filed: Jun. 7, 2002

(65) Prior Publication Data

US 2003/0080065 A1 May 1, 2003

Related U.S. Application Data

(60) Provisional application No. 60/296,862, filed on Jun. 8, 2001.

(51) Int. Cl.$^7$ .................................................. C02F 1/42
(52) U.S. Cl. ........................ 210/681; 210/683; 210/688
(58) Field of Search ................................ 210/670, 681, 210/683

(56) References Cited

U.S. PATENT DOCUMENTS

| | | | | |
|---|---|---|---|---|
| 5,521,008 A | * | 5/1996 | Lieberman et al. | 428/367 |
| 5,705,269 A | | 1/1998 | Pimenov et al. | 428/375 |
| 6,214,607 B1 | | 4/2001 | Logan | 435/262.5 |
| 6,699,393 B1 | | 3/2004 | Baker et al. | |

OTHER PUBLICATIONS

International Search Report dated Sep. 5, 2002. PCT/US02/18239, filed Jun. 7, 2002.
Bauer et al. "Adsorption of poly (diallyl–kimethyl–ammoniumchloride) (PDADMAC) and of copolymers of DADMAC with N–methyl–N–vinyl–acetamide (NMVA) on colloidal silica" Progr. Colloid Polym Sci (1998) 109, 161–169.
Brown et al. "Abiotic and biotic Perchlorate removal in an activated carbon filter." Journal AWWA (2002) 94(2), 70–79.
Gonce et al. "Removal of chlorite and chlorate ions from water using granular activated carbon." Wat. Res., vol. 28, No. 5, 1059–1069.
Gu et al. "Regeneration of Perchlorate (CIO4–)–loaded anion exchange resins by a novel tetrachloroferrate (FeCl4–) Displacement technique." Environ. Sci. & Technol., vol. Xx, No. xx, xxxx.
Gullick. "Occurrence of Percharate in drinking water sources." Journal AWWA. Jan. 2001, 66–77.
Mangun et al. "Surface chemistry, pore sizes and adsorption properties of activated carbon fibers and precursors treated with ammonia." Carbon 39 (2001) 1809–1820.
Menendez et al. "On the modification and characterization of chemical surface properties of activated carbon: in the Search of carbons with stable basic properties." Langmuir 1996, 12, 4404–4410.
Na et al. "Percharate removal via iron–preloaded GAC and borohydride regeneration." Journal AWWA, Nov. 2002, 94:11, 90–101.
Park et al. "Influence of anodic surface treatment of activated carbon on adsorption and ion exchange properties." J. Colloid and Interface Sci. (1999) 218, 331–334.

* cited by examiner

Primary Examiner—Robert A. Hopkins
(74) Attorney, Agent, or Firm—Ohlandt, Greeley, Ruggiero & Perle

(57) ABSTRACT

A method for removing perchlorate or other anionic contaminates from ground water which comprises the step of passing the ground water over activated carbon, wherein the activated carbon has been either preloaded with an organic cation functional group or organic cation polymer or cationic monomer, or tailored with ammonium or other reduced nitrogen-containing compound.

50 Claims, 16 Drawing Sheets

METHOD FOR PERCHLORATE REMOVAL FROM GROUND WATER

This application claims priority from U.S. Provisional Patent Application Ser. No. 60/296,862, Filed Jun. 8, 2001.

The present invention is generally directed to a novel method for substantially reducing perchlorate and/or other anionic contaminants from ground water. In particular, it relates to a method for removing perchlorate and/or other anionic contaminants (e.g., arsenates, arsenites, nitrates, and chromates) from a fluid comprising passing the fluid (e.g., water) over activated carbon, wherein the activated carbon is either pretailored with an enhanced positive surface charge or preloaded with organic cations.

BACKGROUND OF THE INVENTION

Perchlorate appears in the groundwater that 10–20 million Americans could drink; and perchlorate might adversely affect people's thyroid gland. The American Water Works Association Research Foundation (AWWARF) has been charged by Congressional earmark, through the Environmental Protection Agency (EPA), to devise methods for removing perchlorate from groundwater.

Perchlorate ($ClO_4^-$) contaminates groundwater that could potentially be used by millions of people in this country. A considerable portion of this contaminated groundwater lies beneath the ground in arid regions of this country, such as California, Nevada; and it also appears in the vicinity of military bases and aerospace companies in states such as New York, Massachusetts, Pennsylvania and numerous others. This presents a large problem because drinking water, especially during the dry summer months, can become extremely scarce.

Perchlorate appears in water because it has been used in rocket propellant, along with ammonia and solid aluminum. In a number of places where rocket propellants have been manufactured, ammonium perchlorate has been discarded on the soil, and then it has percolated into the groundwater. At the concentrations that perchlorate is found in water (i.e., 1–3000 ppb), it does not naturally decompose in a reasonable time frame, if at all. Perchlorate, at high concentrations, is known to affect the thyroid gland, and it is perceived that it may also affect the thyroid gland at trace concentrations. For this reason, the California Department of Health has identified a 4 ppb action level for perchlorate; and this action level may drop yet further. Other states are contemplating action levels as low as 1 ppb.

There are a few commercially available methods for removing perchlorate. One such process is the passing of perchlorate contaminated water through a bed of ion exchange resin. A disadvantage of such ion exchange resin process is that it utilizes a very high concentration of salts (i.e., 35,000 to 70,000 ppm), and sometimes very expensive catalyst material. This can result in the formation of a brine waste solution (i.e., 35,000 to 70,000 ppm) which must then be properly disposed of without causing environmental issues with the surrounding water tables.

There are also some biological processes that have been developed; but by their very nature, they are less acceptable for treatment of drinkable water for humans, due to the use of microorganisms that could include consortia which are known to cause diseases. Few water utilities would accept the potential liability with placing drinking water in contact with a biological species and then distributing this drinking water to the public, without subsequent filtration which requires yet another unit operation.

Still others have proposed using reverse osmosis processes for the removal of perchlorates from water, but the cost of operating such a reverse osmosis facility has made this process commercially undesirable; and it is not clear that reverse osmosis can remove perchlorate down to the action levels that have been established or are contemplated.

The present inventors have uniquely discovered how to both remove perchlorates and other undesirable anions, such as nitrates, chromates, arsenates, and arsenites, and make them available ultimately for destruction by thermally pretreating or chemically preloading granular activated carbons (GACs) prior to use. Once the chemically preloaded or thermally pretreated GAC has reached the end of its useful service life, it can be regenerated either chemically or thermally and made ready for reuse. The present inventors have uniquely discovered that the process of the present invention is capable of removing perchlorates and other anions by a combination of removal and chemical/thermal regeneration with chemicals that are commercially available in large and inexpensive quantities and which are environmentally acceptable; and which are not known to pose health risks.

The granular activated carbon used pursuant to the process of the present invention provides advantages over other technologies for treating groundwater that is contaminated with both perchlorate and trace organic compounds: (a) GAC can be tailored to remove both perchlorate and organic compounds through a single unit operation rather than two unit operations in series, (b) GAC costs perhaps a tenth as much as ion exchange resins on a per-pound basis, (c) GAC can be thermally reactivated, whereas ion exchange resins decompose at thermal reactivation temperatures; and this means that GAC treatment is conducive to the ultimate destruction of perchlorate via brineless means, and (d) GAC treatment is inherently easy to operate and it does not involve the risks that biological processes do, of releasing microorganisms into a water system.

SUMMARY OF THE INVENTION

A method for removing perchlorate from a fluid (e.g., ground water) comprising: passing the fluid over an activated carbon that has been loaded with an organic cation polymer or monomer; or by passing the fluid over a functionalized carbonaceous material that has been functionalized with ammonia or another reduced nitrogen-containing compound at a temperature below about 700° C.

The activated carbon material is loaded with an organic cation polymer or a cationic monomer, or by treating the carbonaceous material with ammonia or another nitrogen-containing compound at a temperature below about 700° C. The cationic polymer has a molecular weight below about 1,000,000 Daltons, more preferably less than about 500,000 Daltons.

The functional group is at least one selected from the group consisting of: quaternary ammonia, amines, imines, amides, imides, pyrrolic nitrogen, or pyridinic nitrogen.

The organic cation polymer is at least one polymer selected from the group consisting of: plydiallyldimethlammonium chloride, epichlorohydrin dimethylamine, polyethleneimine, polyacrylamide, chitosan, polylysine and diethylaminoethyl(DEAE)-dextran.

The cationic monomer is at least one selected from the group consisting of: octyltrimethylammonium bromide or chloride, decyltrimethylammonium bromide or chloride, dodecyltrimethylammonium bromide or chloride, tetradecyltrimethylammonium bromide or chloride, tributylheptylammonium bromide or chloride, ammonium bromide or chloride, diallyldimethlammonium bromide or chloride, acrylamide, domiphen bromide or chloride, tetradecylammonium bromide or chloride, (4-nitrobenzyl) trimethylammonium bromide or chloride, ar-vinylbenzyl) trimethylammonium bromide or chloride, benzoylcholine bromide or chloride, acetylthiochloine iodide, methacholine bromide or chloride, betaine hydro bromide or chloride, betaine, chlorocholine bromide or chloride, choline chloride or bromide, decamethonium bromide or chloride, hexamethonium bromide or chloride, ferric salt, and ferrous salt.

The cation-loaded activated carbon material or functionalized carbonaceous material is capable of treating the fluid containing at least 50 ppb of the perchlorate, such that perchlorate is removed from the fluid to an amount of less than 4 ppb for at least 3,000 bed volumes.

The present invention also involves the method of reactivating the cation-loaded activated carbon material or functionalized carbonaceous material via thermal treatment, whereby the functionalized activated carbon material has a bed volume life of at least about 10% of the initially treated functionalized activated carbon material.

A method comprising the step of adjusting the pH of the fluid prior to passing over the cation-loaded activated carbon material or functionalized carbonaceous material such that the pH of the fluid is in the range between about 3.0 to 9.0.

The perchlorate concentration level in the fluid after passing over the activated carbon is 4 ppb or less.

Another embodiment according to the present invention includes a method for removing anionic contaminants (e.g., arsenates, arsenites, nitrates, and chromates) from a fluid comprising: passing the fluid over a cation-loaded activated carbon material or functionalized carbonaceous material.

Still another embodiment according to the present invention relates to a functionalized activated carbon material which exhibits a positive surface charge greater than about 0.09 milliequivalents/gram, as measured accordance with the Surface Charge Titration protocol at a pH of 7.5, provided that it also exhibits a BET surface area greater than 850 m$^2$/g as measured in accordance with the BET Surface Area protocol.

Yet another embodiment of the present invention includes a functionalized carbonaceous material which exhibits a positive surface charge greater than about 0.09 milliequivalents/gram, as measured accordance with the Surface Charge Titration protocol at a pH of 7.5, provided that it also exhibits a BET surface area greater than 850 m$^2$/g as measured in accordance with the BET Surface Area protocol, wherein the functionalized activated carbon material is formed by: (a) loading the carbonaceous material with an organic cation polymer or cationic monomer, (b) treating the carbonaceous material with ammonia or another reduced nitrogen-containing chemical at a temperature below about 700° C., or (c) functionalizing with an organic cation functional group.

DETAILED DESCRIPTION OF THE PREFERRED EMBODIMENT

Figure 1:
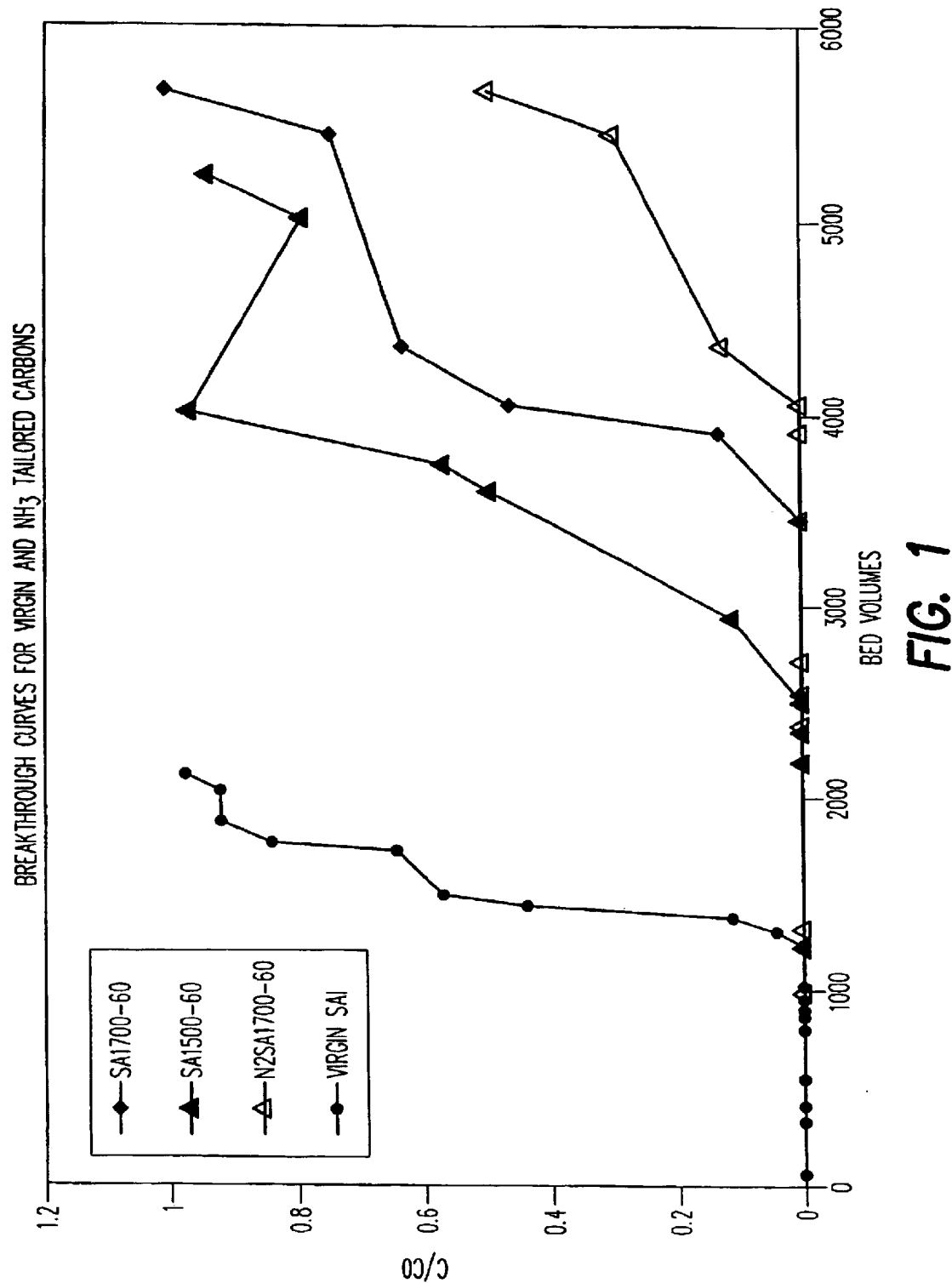
FIG. 1 is a graph plotting breakthrough curves for virgin and ammonia-tailored carbons according to the present invention.

The present invention pertains to a unique process for removing perchlorate and/or other anions from water with activated carbon that has been tailored with metal salt and/or organic complex preloading and/or thermal pretreatment in a reduced-nitrogen containing gas environment. The tailoring or preloading treatment of activated carbon has uniquely been found to enhance the activated carbon's capability to remove perchlorate and other anions versus virgin activated carbon. The present invention also includes an inexpensive and environmentally friendly, and hygienically safe process for restoring or regenerating the activated carbon's capacity to remove perchlorate once this capacity has become exhausted. The perchlorate removal capacity is restored by thermally treating the granular activated carbon (GAC).

The present inventors have unexpectedly discovered that the activity level of GAC can be extended three-to-fourfold during perchlorate removal by thermally pretreating the GAC with ammonia gas below 700° C., or by more than fivefold if the GAC is preloaded the GAC with an NSF-approved organic cation polymer. Moreover, perchlorate removal with GAC can be extended by more than sixteen times if the GAC is preloaded with a cationic monomer.

By chemically tailoring activated carbon, its bed life can be substantially extended for the purpose of adsorbing perchlorate. Successful tailoring has been achieved by thermally treating the activated carbon in ammonia or other reduced nitrogen-containing gas or substance, or by preloading the activated carbon with organic cations. The reduced nitrogen containing gases and substances include ammonia gas, urea, and species that contain nitrogen with a valence that is less than zero. Such gases exclude nitrogen ($N_2$) gas, for which the nitrogen valence is zero.

Structures of the Functional Groups

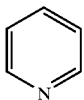

Pyridinic nitrogen - the chemical shown here is pyridine

Pyrrolic nitrogen - the chimcal shown here is pyrrole

Imine

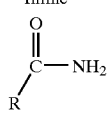

Amide

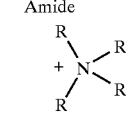

Quaternary ammonia

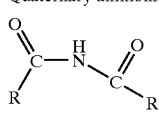

Imide

Amine

BET Surface Area Protocol

The pore distribution and specific surface area of these granular activated carbons (GAC) are determined via ASAP 2010 (Micromeritics, USA) while using argon as the absorbent gas. Before obtaining adsorption or desorption isotherms, the sample was degassed at a temperature of 378° K. to remove any adsorbed contaminants that may have been present on the GAC surface. Argon adsorption isotherms, which are measured at argon's boiling point (87.29° K.), are experimentally determined for GAC samples over the relative pressure range of $10^{-6}$ to 0.99 atmospheres of pressure. These isotherms are then translated into a volume per mass pore size distribution (mL pores/g GAC) via the density functional theory (DFT) software that is provided with the ASAP 2010. Specific BET Surface Areas are calculated by the BET method from the isotherm by using the Micromeritics software, which assumes multiple layer adsorption.

Small Scale Simulation Test Protocol

Small-Scale Simulation tests can be run to simulate the adsorption of perchlorate at full-scale. It was this protocol that was employed herein to monitor the capacity for tailored activated carbon to adsorb perchlorate, unless otherwise specified herein. Perchlorate has been shown to exhibit proportional diffusivity onto activated carbon, in which case the following equation applies.

$$EBCT_{SC}/EBCT_{LC}=D_{SC}/D_{LC},$$

EBCT is the empty bed contact time (volume of vessel/flow rate)

SC is the small-scale column

LC is the large column (or full-scale column) being simulated

D is the average size of the GAC grains (although the GAC grains are normally given in terms of a mesh size, in this case the units are millimeters).

The EBCT and GAC grain size for the full-scale column are known. The grain size for the small-scale column is then chosen (a smaller grain size than full-scale) and the required EBCT for the small-scale column can be solved for.

With the EBCT solved for, velocity in the small-scale column can be solved for (velocity assuming the vessel or column is empty).

$$U_{SC}/U_{LC}=(D_{LC}/D_{SC})(Re_{SC.\ min}/Re_{LC})$$

U is velocity $Re_{LC}$ is the Reynolds number for the full-scale column $Re_{SC.\ min}$ is the minimum Reynolds number in the small-scale column, equal to 0.13 for perchlorate.

With the velocity known, the column length can be calculated $$L=EBCT_{SC}*U_{SC}$$

There is some freedom with the diameter of the column (d), but it must be a minimum of 50 times the average grain size to avoid "wall effects".

The volume of the column (1 bed volume)=$\pi d^2 L/4$.

The volume that is computed for empty bed contact time is normalized to where the mass per volume for the small scale column is equivalent to the mass per volume for the full scale column that is being simulated. Once the small-scale column is constructed, water that contains perchlorate or another contaminant can be passed through the column at the specified flow rate. The effluent from the small-scale column can be collected and tested for perchlorate or another contaminant.

Figure 15:
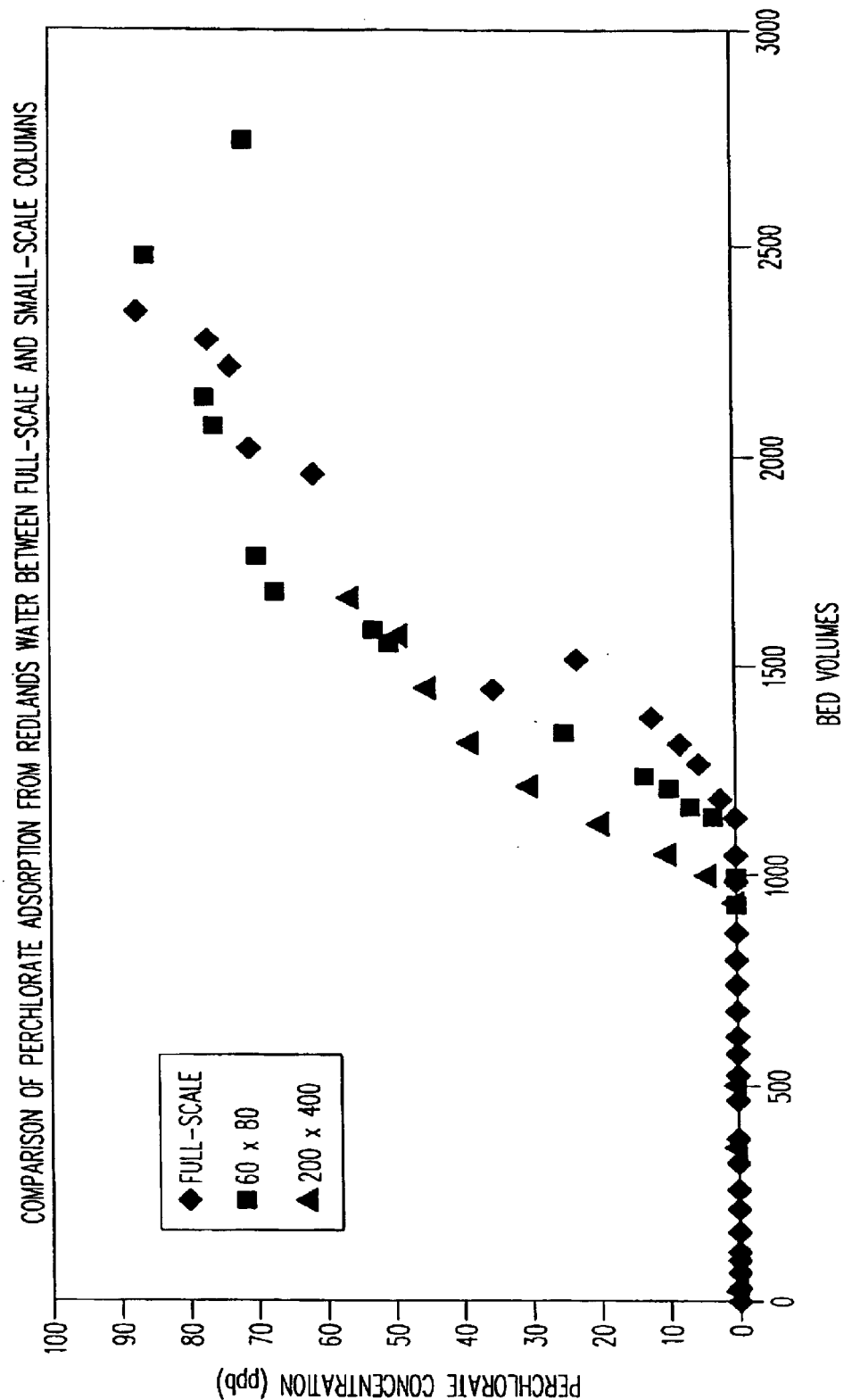
FIG. 15 is a graph plotting perchlorate concentration versus bed volumes in a comparison of perchlorate adsorption from Redlands water between full-scale and small-scale columns.

FIG. 15 shows the comparison between full-scale data gathered at Redlands, Calif. which employs 8×30 mesh GAC to small-scale columns operating with 60×80 mesh and 200×400 mesh. These columns were designed using the above equations. As FIG. 15 illustrates, these columns work very well to simulate full-scale performance.

Surface Charge Titration Protocol

Surface charge distribution tests were carried out using a DL53 titrator (Mettler Toledo). 0.01 M or 0.1 M NaCl solution was applied as the background electrolyte.

200 mL of this solution was drawn to a sample jar that was attached to DL53 titrator. After dispensing of 0.5 mL of 0.04 M HCl into the solution (pH should be around 4.107 for 0.1 M NaCl solution and 4.045 for 0.01 M NaCl solution), the solution was stirred for 50 minutes to drive off $CO_2$ with an $N_2$ bubbler inserted into the solution.

After 50 minutes, 2 mL of 0.2 M NaOH was added to the solution (pH of 0.1 M NaCl should be about 9.891 and pH of 0.01 M NaCl should be about 9.952 after the addition of NaOH). After yet a few more minutes that allowed the solution equilibrate, about 0.15 g of activated carbon was added to the solution and it was stirred for another 30 minutes to make sure that the carbon was distributed evenly. The titration began after this. 0.1 mL of 0.04 M HCl was added to the solution every 10 minutes. The resultant pH value was recorded and the endpoint for titration was set to be 5 mL of HCl. The same procedure was carried out for a blank solution (only without adding the carbon sample). The pH difference between the blank and the sample solution was interpreted as being because of the surface ionic exchange capacity of the carbon samples. Thus the pH difference was converted to the hydrogen ion difference in the solution, which was equal to the surface charge of the carbon surface.

Protocol for Preloading Organic Cation Polymer or Cationic Monomer

In the preloading step according to the present invention, the organic cation polymers and cationic monomers were dissolved in an aqueous solution and recirculated through a bed of activated carbon for a given time period. The cations can also be loaded via a batch process. Background ionic strength and pH can be adjusted to optimize loading conditions. The pre-loading of these materials onto the activated carbon was at ambient temperature and pressure.

Ammonia Thermal Pretreatment experiments have employed an array of temperatures (500-<700° C.) and durations (30–150 minutes). These thermal treatments of a bituminous activated carbon (SAI Company) were achieved by placing a sample of GAC in a thermogravimetric analyzer (TGA), heating the GAC sample under nitrogen ($N_2$) gas, and then exposing the GAC to ammonia gas at the target temperature for the predetermined time. These samples have been denoted in the following table and figures by carbon type, temperature of ammonia exposure, and time of ammonia exposure. For example, SAI 500° C.-60 min is an SAI carbon that was pretreated in ammonia gas at 500° C. for 60 minutes.

The thermal treatment on perchlorate removal has been evaluated via rapid small-scale column tests, and these results have been compared to the GACs' micropore volume, mesopore volume, surface area, and surface charge (Table 1). Small-Scale Simulation tests have been designed and verified to simulate the conditions of the Redlands, Calif. activated carbon beds. Briefly, an empty bed contact time (EBCT) of 0.75 minutes in the mini-columns with #200×#400 mesh carbon corresponds to a 20 minute EBCT in full-scale conditions; and a full-scale treatment duration of a month could be simulated within several days in the Small Scale Simulation tests. All tests that are described herein have employed the Redlands, Calif. groundwater from its Texas Street well, and this water contained 65–75 ppb perchlorate.

Pore structure analyses were conducted by means of Micromeritics (Norcross, Ga.) ASAP 2010 units, as described above. Slurry pH represented the pH of a 10% slurry of the GAC. Surface charge distribution was appraised by a DL53 Metler Toledo automatic titrator, by first elevating a sample pH to 10–10.5, and then dosing in incremental amounts of acid, as described above.

As shown in Table 1 and FIG. 1, the most favorable ammonia thermal treatments thus far have achieved a four fold improvement in the bed volumes to breakthrough of 4 ppb perchlorate. Translated to the Redlands, Calif. conditions at the Texas Street activated carbon beds, this means that instead of the carbon beds lasting 1½ months before breakthrough, they could last 6 months before breakthrough by employing the ammonia thermal treatment that have been tailored thus far.

Figure 2:
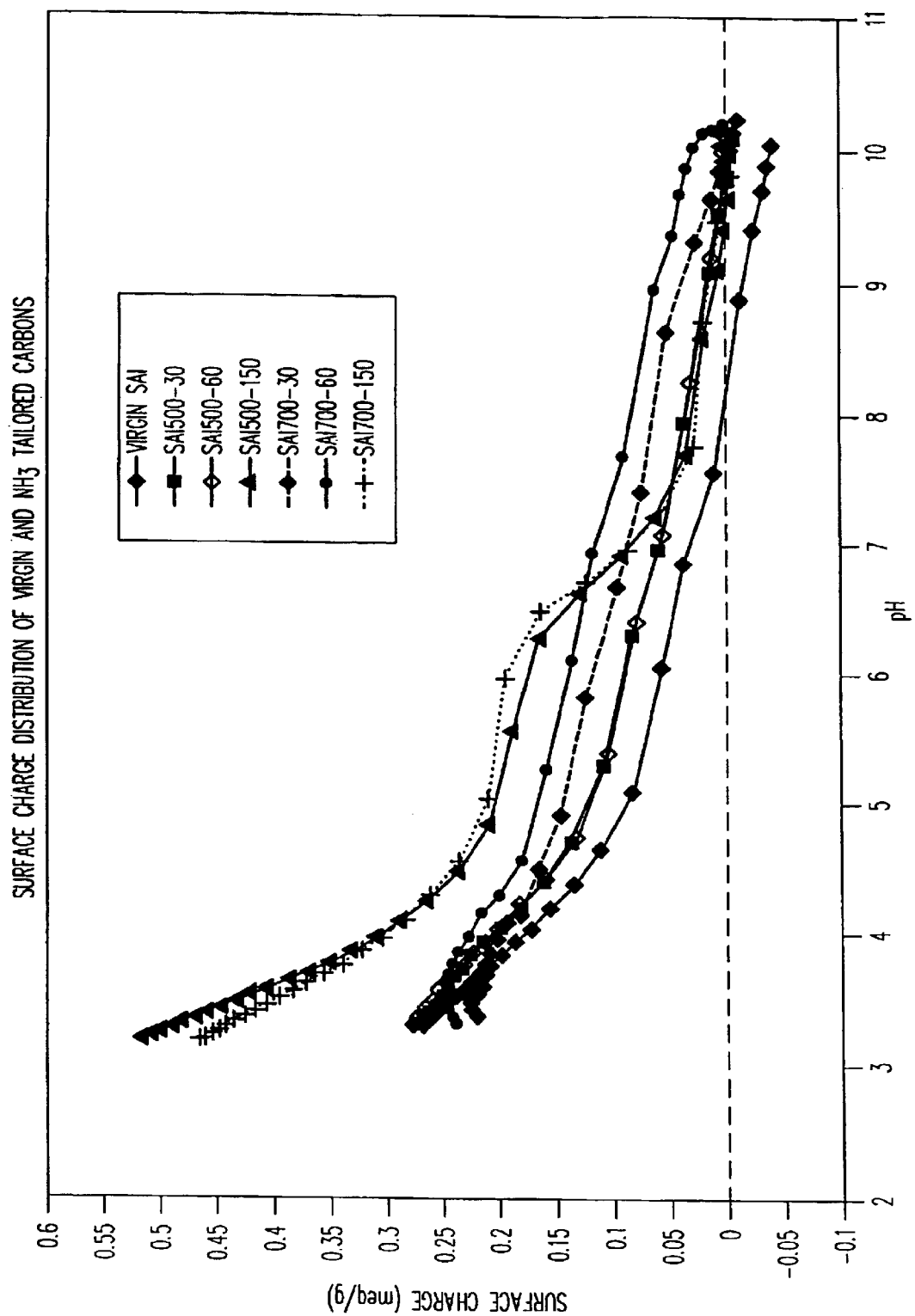
FIG. 2 is a graph plotting surface chare versus pH for virgin and ammonia-tailored activated carbons.
Figure 3:
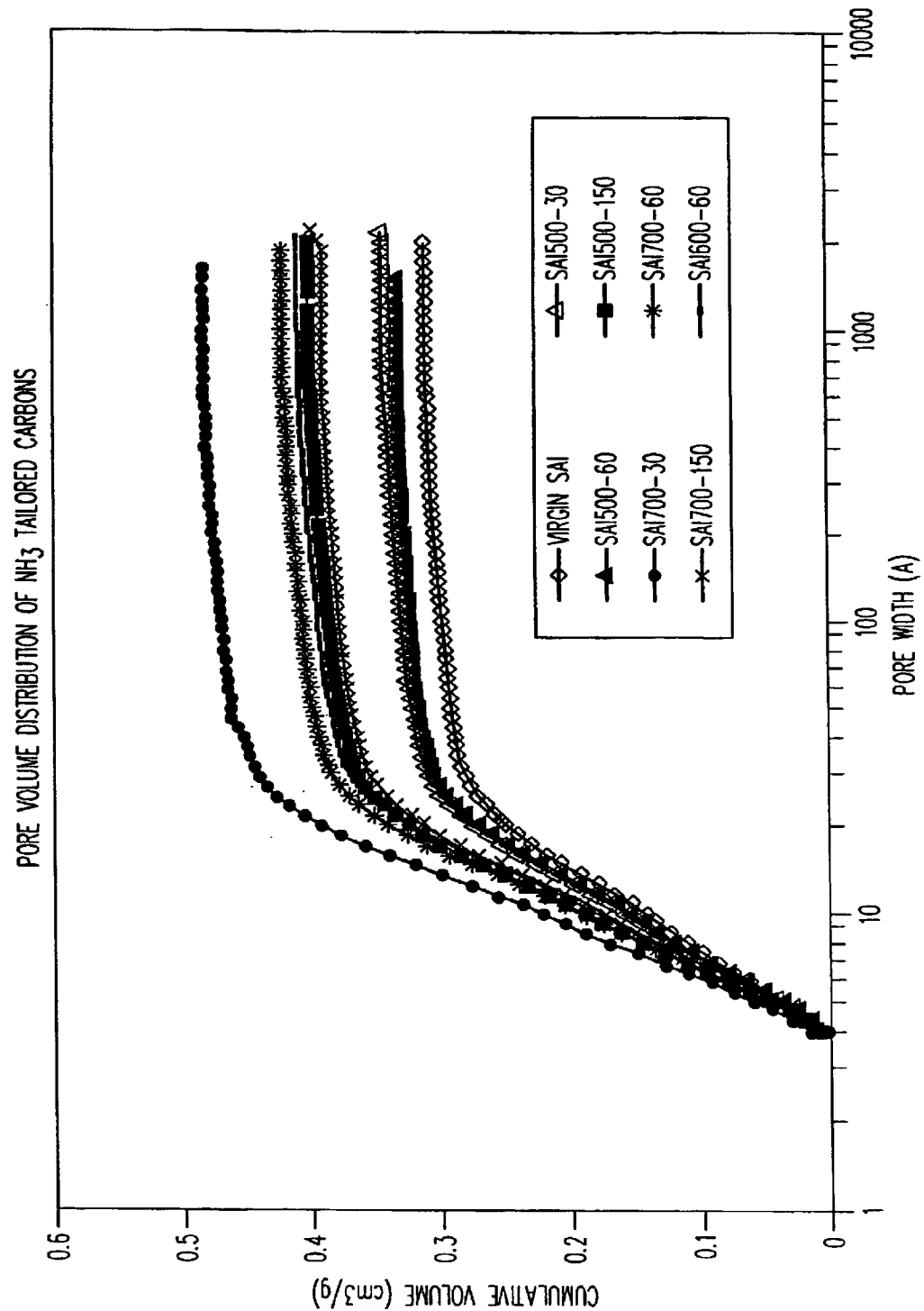
FIG. 3 is a graph plotting cumulative volume versus pore width of ammonia-tailored activated carbons.

The data in Table 1, FIG. 2 and FIG. 3 shows that increasing bed volumes to perchlorate breakthrough corresponded to increasing micropore volume, mesopore volume, slurry pH, BET Surface Area, and positive surface charge at pH 7.5. The present inventors have selected a pH of 7.5 for this comparison, because the Redlands water has a pH of 7.5. Other tests with various commercial activated carbons have shown that increasing perchlorate adsorption has corresponded to decreasing oxygen content within the GAC, increasing slurry pH, and increasing positive surface charge at pH 7.5. These tests also showed some relationship between pore volume distribution and perchlorate removal, but the pore volume appeared not to be the most important criteria.

TABLE 1

Perchlorate Adsorption Capacity in Small Scale Simulation tests; and Physical/Chemical Characteristics of Activated Carbons that have been Thermally Treated in Ammonia Gas

| Sample | Bed Volumes to 4 ppb $ClO_4$ breakthrough (L/L) | Micropore volume, (mL/g) | Mesopore volume, (mL/g) | BET Surface Area ($m^2/g$) | Slurry PH | Surface charge at pH 7.5 (+meq/g) |
|---|---|---|---|---|---|---|
| Virgin SAI | 1,000 | 0.193 | 0.059 | 874 | 8.75 | 0.011 |
| Calgon Filtrasorb 400 | 1300 | 0.31 | | 969 | 9.48 | 0.08 |
| Calgon Fitrasorb 600 | 2300 | 0.27 | | 719 | 10.31 | 0.15 |
| Calgon Centaur | 1500 | 0.31 | | 806 | 9.59 | 0.08 |
| SAI 500° C., 30 min | Na | 0.182 | 0.064 | 854 | 9.59 | 0.050 |
| SAI 500° C., 60 min | 2,500 | 0.188 | 0.061 | 861 | 9.86 | 0.050 |
| SAI 500° C., 150 min | Na | 0.202 | 0.072 | 864 | 9.92 | 0.050 |
| SAI 600° C., 60 min | 4000+* | 0.19 | 0.05 | 907 | na | na |
| SAI 700° C., 30 min | Na | 0.231 | 0.089 | 1084 | 9.67 | 0.075 |

TABLE 1-continued

Perchlorate Adsorption Capacity in Small Scale Simulation tests; and Physical/Chemical Characteristics of Activated Carbons that have been Thermally Treated in Ammonia Gas

| Sample | Bed Volumes to 4 ppb $ClO_4$ breakthrough (L/L) | Micro-pore volume, (mL/g) | Meso-pore volume, (mL/g) | BET Surface Area ($m^2$/g) | Slurry PH | Surface charge at pH 7.5 (+meq/g) |
|---|---|---|---|---|---|---|
| SAI 700° C., 60 min | 3,500 | 0.202 | 0.080 | 940 | 10.17 | 0.095 |
| SAI 700° C., 150 min | Na | 0.197 | 0.085 | 965 | 9.94 | 0.050 |
| SAI $N_2$, 700° C., 60 min | 4,100 | na | na | na | na | Na |

*No breakthrough had yet occurred at 4,000 bed volumes.

Organic Cation Preloading has also dramatically enhanced perchlorate removal to below 4 ppb. When using polymers, proloading has achieved the most favorable results when employing polydiallyldimethylammonium chloride (PDADMAC) or related quaternary ammonium compounds. As shown in the top half of Table 2, we have achieved 5,000 bed volumes before 4 ppb breakthrough after preloading with PDADMAC.

Figure 4:
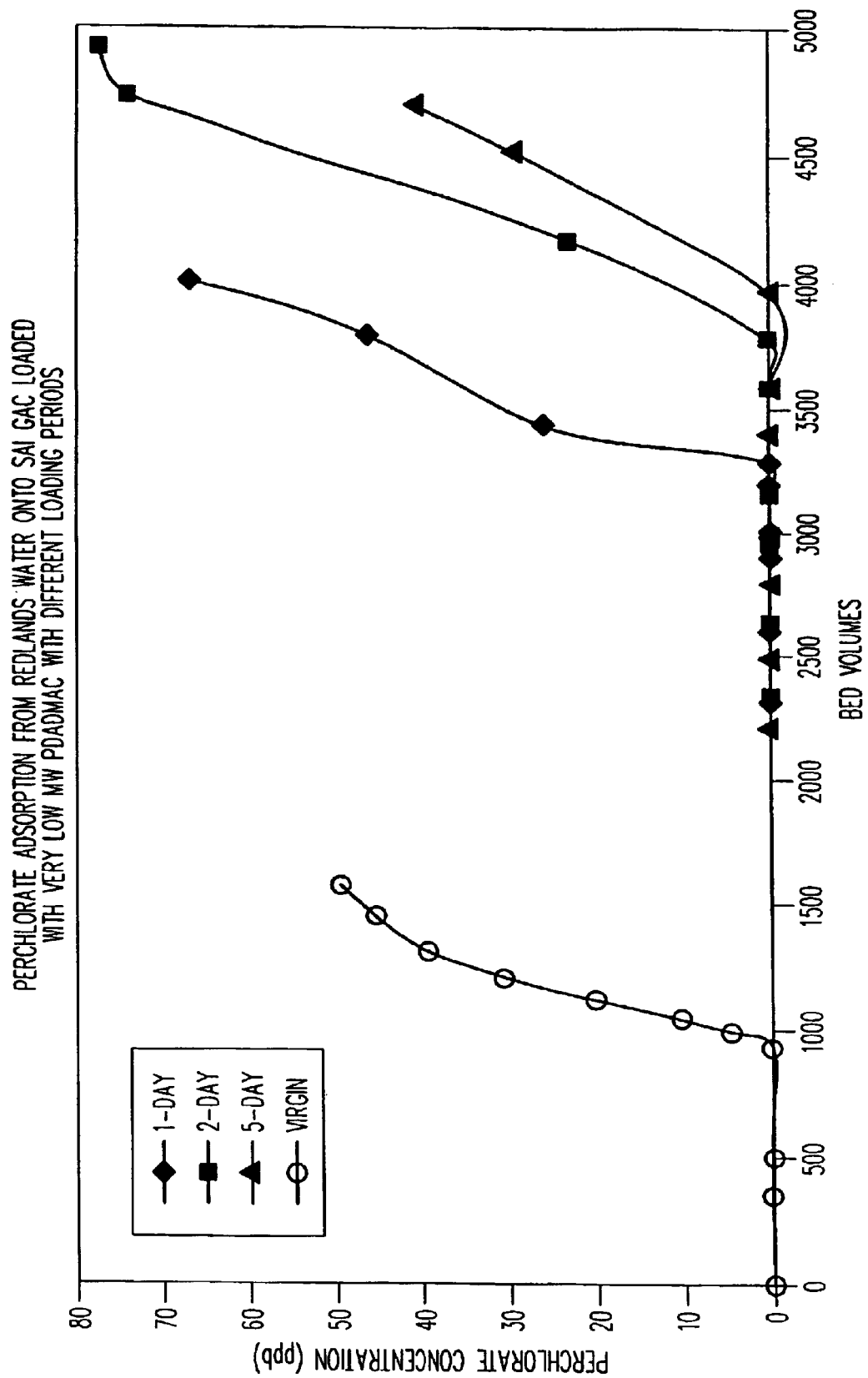
FIG. 4 is a graph plotting perchlorate adsorption from Redlands water onto GAC loaded with very low molecular weight polydiallyldimethylammonium chloride (PDADMAC) with different loading periods.

When preloading with polymers as indicated in the top half of Table 2, bed volumes to 4 ppb perchlorate breakthrough were greater after preloading with the lower molecular weight polymers rather than the higher molecular weight polymers. Also, higher bed volumes to breakthrough corresponded to a more mesoporous activated carbon rather than a more microporous activated carbon, and after preloading the polymer for 2–5 days rather than 1 day. This was because more of the polymer could be preloaded if it had the lower molecular weight, if the pores were larger, and if there was more time for the polymer to diffuse into the GAC. Specifically, after pre-loading with "very low" molecular weight PDACMAC (molecular weight <100,000 Daltons) for 5 days onto the bituminous SAI GAC, the GAC's bed life for adsorbing perchlorate to <4 ppb increased to 4000 bed volumes. This was four times longer than for the virgin SAI GAC (see also FIG. 4).

This loading condition of "very low" molecular weight poly-DACMAC onto the microporous SAI carbon achieved 25–30 mg of polymer loading per gram of GAC. An organic polymer with a 100,000 Dalton molecular weight would have a nominal diameter of 60 A, if clustered into a ball; whereas one with a 10,000 D molecular weight would have a 30 A diameter. Thus, not much of the "very low" molecular weight (MW) poly-DACMAC could have fit into the bituminous GAC's micropores, which have widths <20 A; and the bituminous GAC contained three times as many micropores (0.19 mL/g) as mesopores (0.06 mL/g; see Table 1).

TABLE 2

Preloaded Organic Cation Polymers or Cationic Monomers onto GAC: Effect on Duration for Removing Perchlorate in Small-Scale Simulation Tests

| Preloading Condition | BV to 4 ppb perchlorate breakthrough |
|---|---|
| Preload with Organic Cation Polymers: | |
| SAI bituminous GAC | 1,000 |
| SAI; High MW PDADMAC (MW > 500,000 D), | 1,100 |
| 1 day preload | |
| SAI; Med. MW PDADMAC (200,000 < MW < 500,000 D), 1 day preload | 1,900 |
| SAI, Low MW PDADMAC (100,000 < MW < 200,000 D), 1 day preload | 2,400 |
| SAI, very low MW PDADMAC (MW < 100,000 D), 1 day preload | 3,300 |
| SAI, very low MW PDADMAC (MW < 100,000 D), 2 day preload | 3,800 |
| SAI, very low MW PDADMAC (MW < 100,000 D), 5 day preload | 4,000 |
| HYDARCO 4000 lignite GAC (mesoporous) very low MW PDADMAC (MW < 100,000), 2 day preload | 5,000 |
| Ultracarb bituminous GAC (mesoporous) very low MW PDADMAC (MW < 100,000), 2 day preload | 5,000 |
| Preload with Cationic Monomers: | |
| SAI, decyltrimethylammonium bromide | 11,000+* |
| SAI, tetradecyltrimethylammonium bromide | 4,000+* |
| SAI, tributylheptylammonium bromide | 16,500+* |

*Ran out of Redlands water before any breakthrough was observed.

In contrast to this, the present inventors have discovered that a predominantly mesoporous lignite carbon could sorb more "very low" molecular weight PDACMAC, and therefore could offer greater perchlorate adsorption capacity. The present inventors therefore employed the NORIT HYDRODARCO 4000, a lignite GAC that contains 0.2 mL/g micropore volume and 0.3 mL/g mesopore volume. They were able to load 80 mg/g of this "very low MW" PDADMAC onto this carbon. This preloaded lignite achieved 5,000 bed volumes before breakthrough of 4 ppb perchlorate. Westates's Ultracarb, a mesoporous bituminous activated carbon, was also able to achieve 5,000 bed volumes before perchlorate breakthrough of 4 ppb when it was preloaded with "very low" molecular weight PDADMAC.

Figure 5:
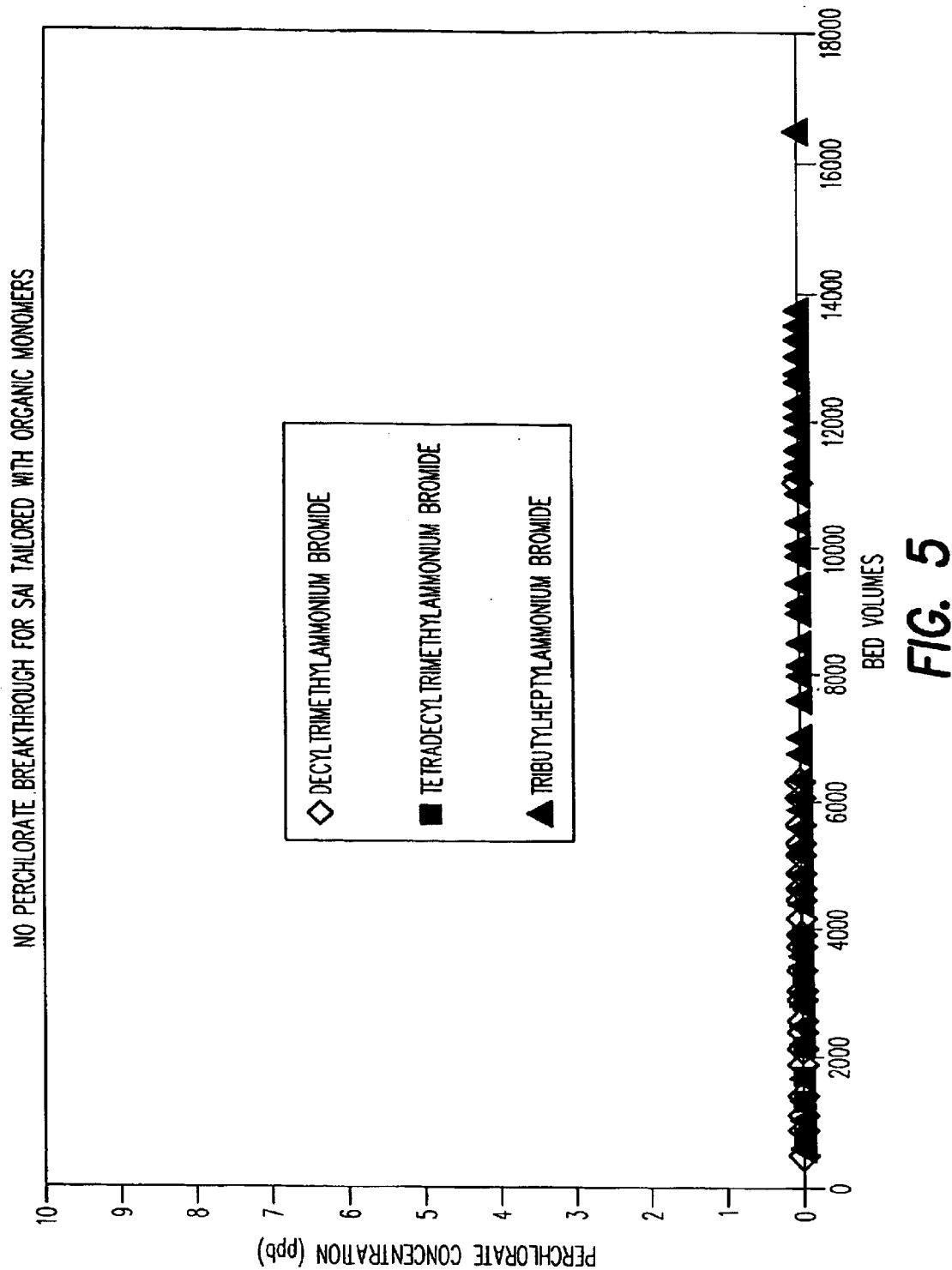
FIG. 5 is a graph plotting perchlorate concentration versus bed volumes for a granular activated carbon (GAC) that has been loaded with various nitrogen-containing chemicals according to still another embodiment of the present invention.

In light of the more favorable performance with the "very low MW" PDADMAC, we wanted to discern whether organic cation monomers, such as quaternary ammonium monomers could perform yet better than their polymer counterparts. Three species have been tested to date, as listed in the bottom half of Table 2. The GAC that was preloaded with tributylheptylammonium bromide had processed 16,500 bed volumes without any perchlorate breakthrough when we ran out of Redlands water (see FIG. 5).

Activated Carbon beds offer several inherent or potential advantages over other unit operations for removing perchlorate:

Firstly, this tailored GAC approach according to the present invention offers straightforward operations to municipalities: activated carbon systems require infrequent operator attention, when compared to other unit operations. GAC bed operations involve perhaps daily or weekly visits for a couple hours a visit. Then, when the beds exhaust their capacity to adsorb perchlorate, the utility can call the activated carbon service representative; who will replace the activated carbon.

Secondly, activated carbon can remove both perchlorate and trace organic compounds in a single unit operation. This is important for numerous municipalities who are down-gradient from aerospace manufacturing plants or military bases, where both organic contaminants and perchlorate have been released into the groundwater. In contrast, if a utility chooses to use GAC to remove organic contaminants and ion exchange to remove perchlorate, the utility must construct and manage two unit operations.

Thirdly, in that activated carbon systems employ physical/chemical methods, their operations are more straightforward than biological systems to many water treatment operators. Also, there is concern about microorganism release from biological systems. Yet further, several of the biological treatment protocols call for co-feeding an organic compound such as ethanol or acetate; and then the municipality must also treat the ethanol or acetate.

Figure 6:
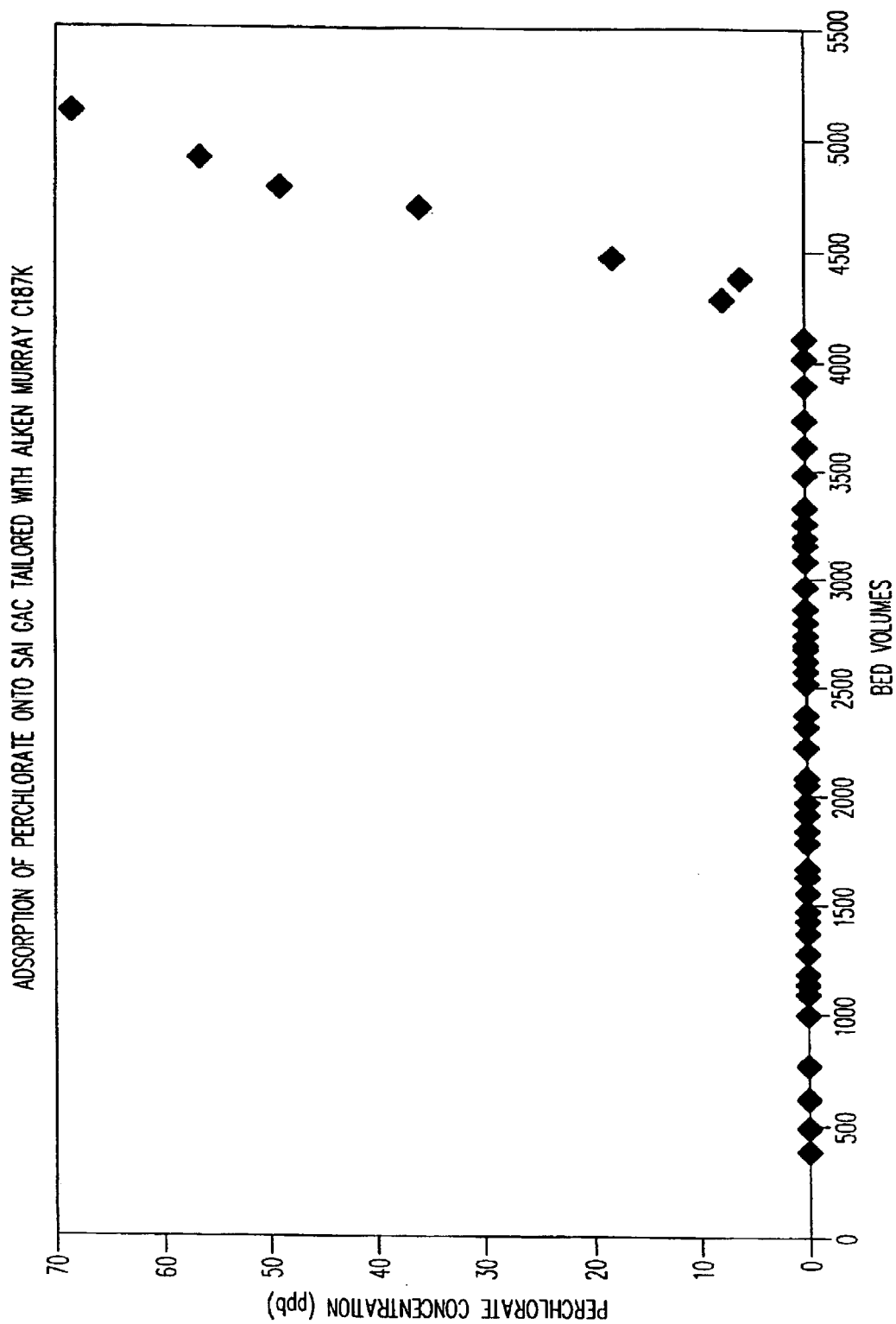
FIG. 6 is a graph plotting perchlorate concentration versus bed volumes for a granular activated carbon (GAC) that has been preloaded with an organic cation according to the present invention.

FIG. 6 shows the adsorption of Perchlorate onto SAI GAC that has been preloaded with the organic cation polymer, C187K. C187K is a product from Alken-Murray and its functional group is a quaternary ammonia. This test was conducted with 60×80 mesh size GAC and used Redlands water. 4200 BV were treated before the effluent showed signs of perchlorate breakthrough. This corresponds to a 3.5 times increase in bed volumes treated vs. that of the virgin SAI.

Figure 7:
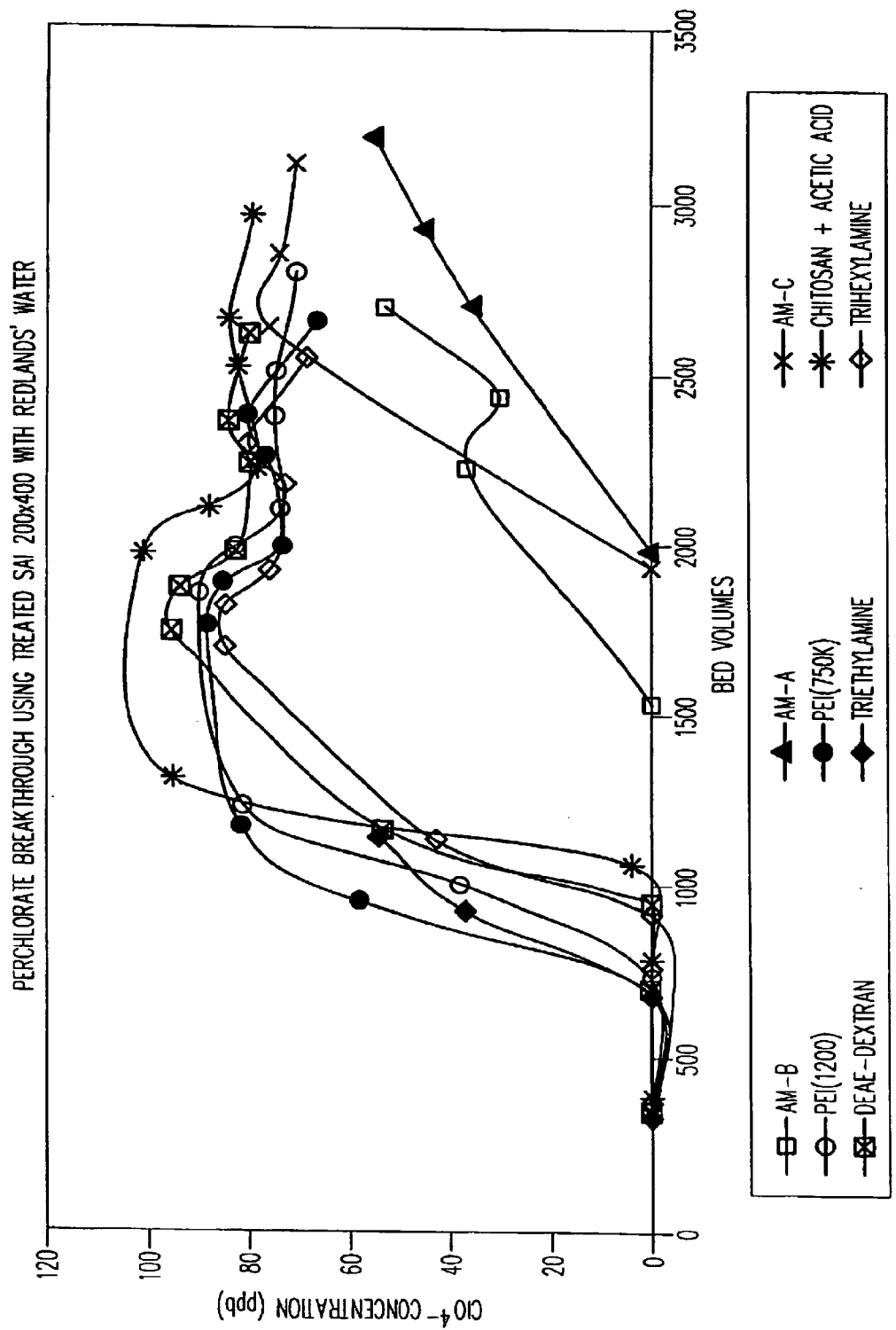
FIG. 7 is a graph plotting perchlorate concentration versus bed volumes for a granular activated carbon which has been preloaded with various organic cations according to the present invention.

FIG. 7 shows the adsorption of perchlorate onto 200×400 SAI GAC tailored with a variety of organic cation polymers. In this test, the polymers with quaternary ammonia functional groups worked the best (C187K, C186K) while polyethyleneimine (PEI), diethylaminoethyl (DEAE)-Dextran, chitosan, triethylamine, and trihexylamine did not provide great enhancement The preloading conditions will need to be further optimized for these material to provide added perchlorate adsorption.

Figure 8:
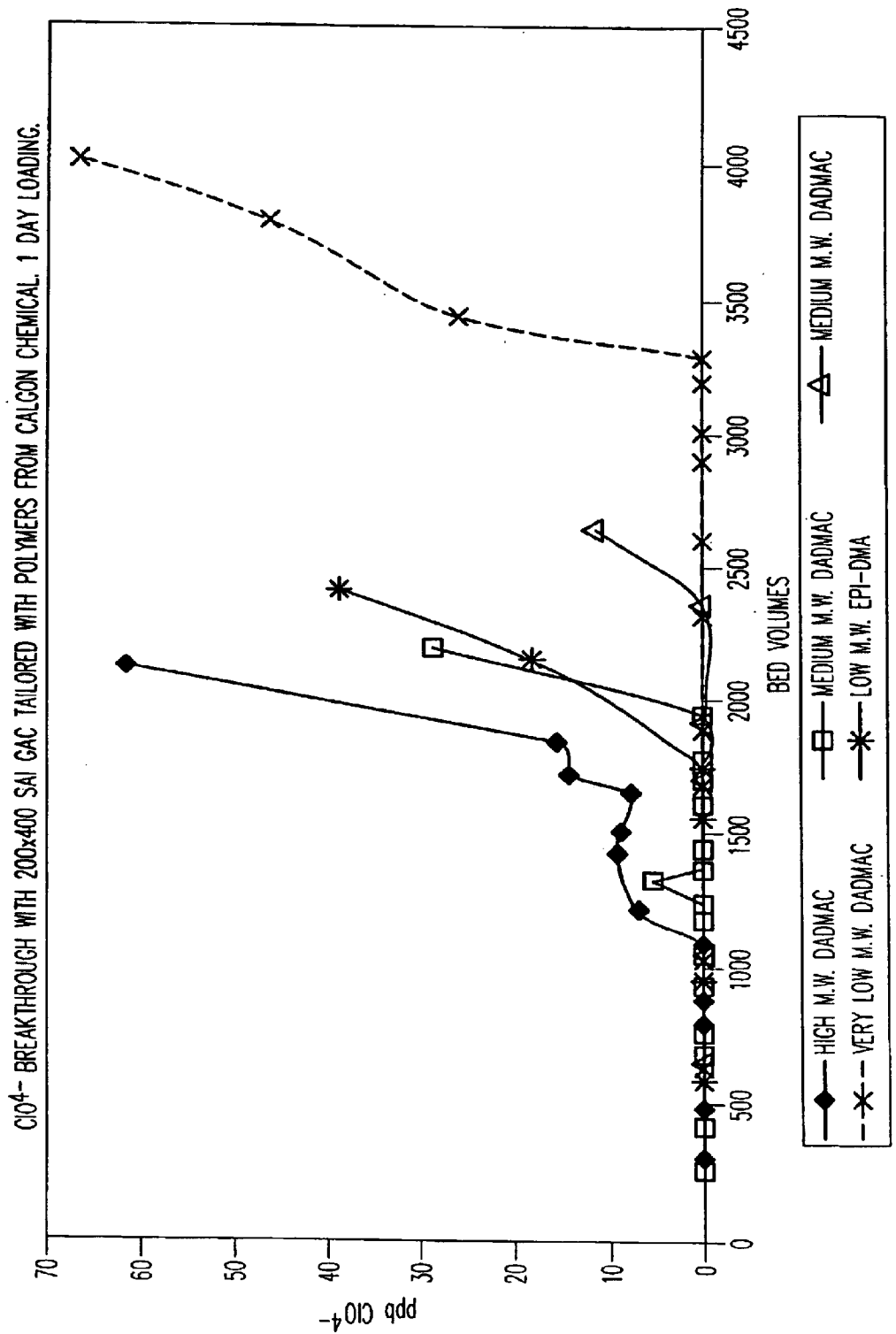
FIG. 8 is a graph plotting perchlorate concentration versus bed volumes for a granular activated carbon (GAC) that has been preloaded with polydiallyldimethylammonium chloride (PDADMAC) of various molecular weights to determine the most effective in extending bed volume life according to the present invention.

FIG. 8 shows the effect of different molecular weights of the organic cation polymer PDADMAC on the adsorption of perchlorate. PDADMAC of 4 different molecular weights (high: 500,000–1,000,000, medium: 200,000–500,000, low: 100,000–200,000, and very low: <100,000) was passed through columns of GAC for one day. Following the one day loading period, Redlands water was passed though the column and the effluent from each column was collected and tested for perchlorate. The most effective MW range was very low with the high MW being least effective.

Figure 9:
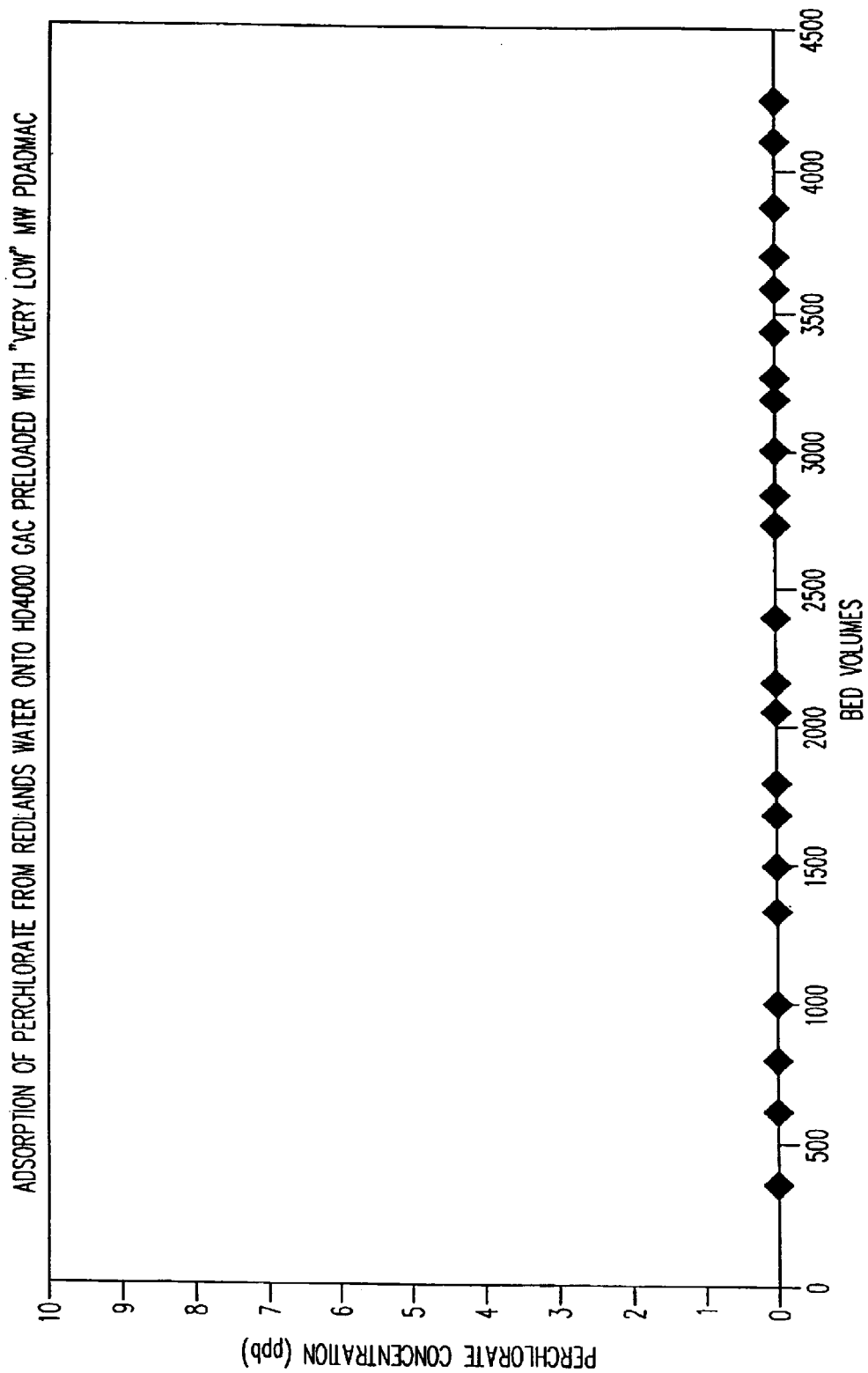
FIG. 9 is a graph plotting perchlorate concentration versus bed volumes for a granular activated carbon (GAC) that has been preloaded with very low molecular weight polydiallyldimethylammonium chloride (PDADMAC) according to the present invention.
Figure 10:
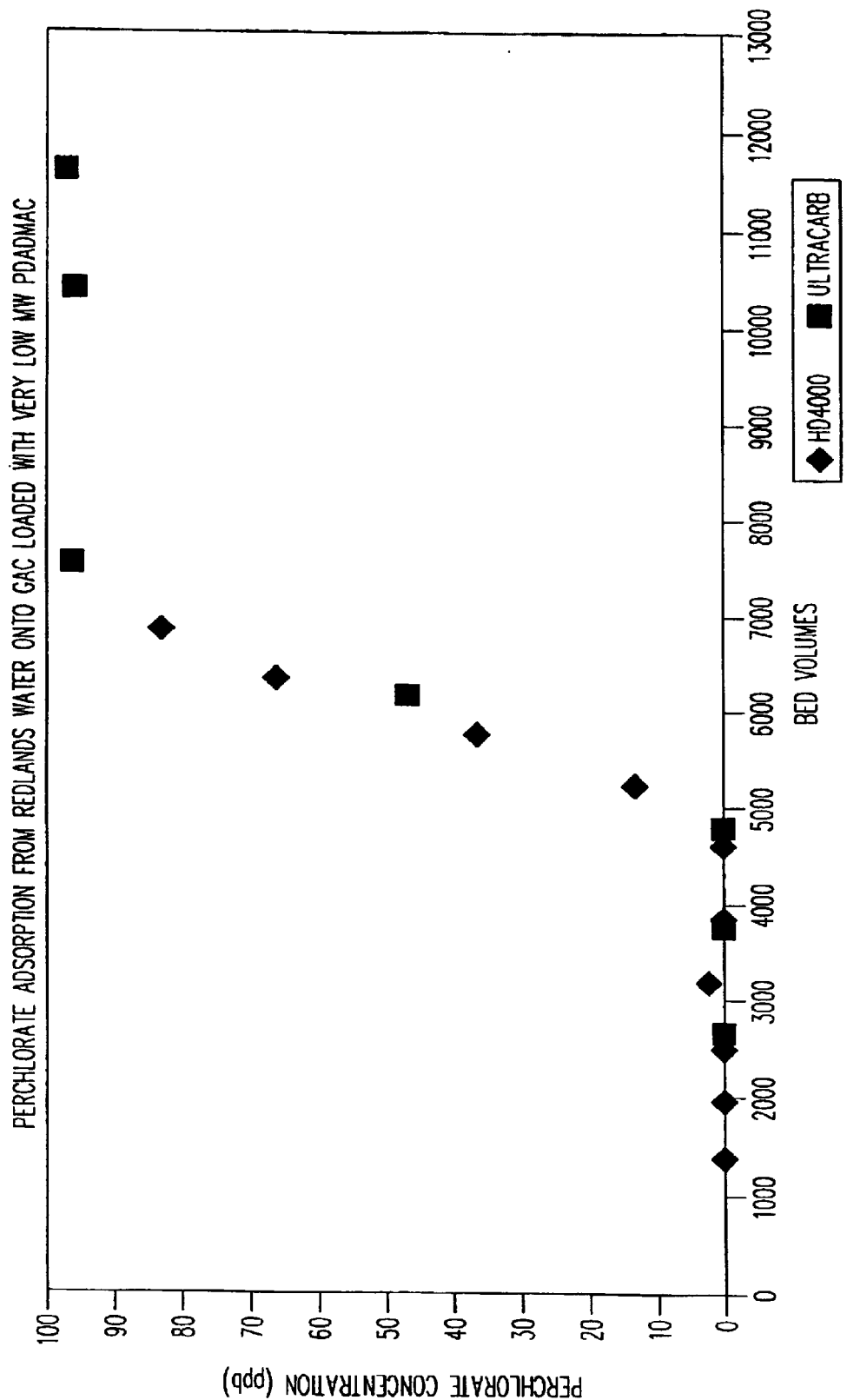
FIG. 10 is a graph plotting perchlorate adsorption from Redlands water onto GAC loaded with very low molecular weight polydiallyldimethylammonium chloride (PDADMAC)

FIGS. 9 and 10 show the effect of tailoring NORIT HYDRODARCO 4000 and Westates Ultracarb with the "very low" molecular weight PDADMAC. In this test, the columns of GAC were loaded for a period of two days. FIG. 9 shows results of a Small Scale Simulation test with HD4000 that achieved 4,200 BV of perchlorate removal without breakthrough. The experiment had to be ceased due to a lack of Redlands water. The experiment was run again (as shown in FIG. 10), with a column of Ultracarb added as well. Both columns were able to treat 5,000 BV of Redlands water before perchlorate breakthrough occurred. HD4000 is a lignite based carbon, and thus has a larger mesopore volume by nature than the bituminous SAI GAC used in most of the tests. Ultracarb, although a bituminous GAC, has a higher mesopore volume as well.

EXAMPLE 1

Test were conducted via small Scale Simulation tests that were sized to simulate performance in a full-scale adsorber. Correlation between the Small-Scale Simulation Tests and full scale performance was confirmed by comparing several sets of conditions. In these tests, ground water from Redlands, California that contained 75 ppb of perchlorate was passed through Small Scale Simulation Test columns that contained GAC. The GAC was tailored in ways that enhanced its capacity to adsorb perchlorate. Perchlorate removal performance was monitored by noting how many bed volumes of water were processed before the perchlorate began to appear at significant levels in the effluent.

EXAMPLE 2

Figure 11:
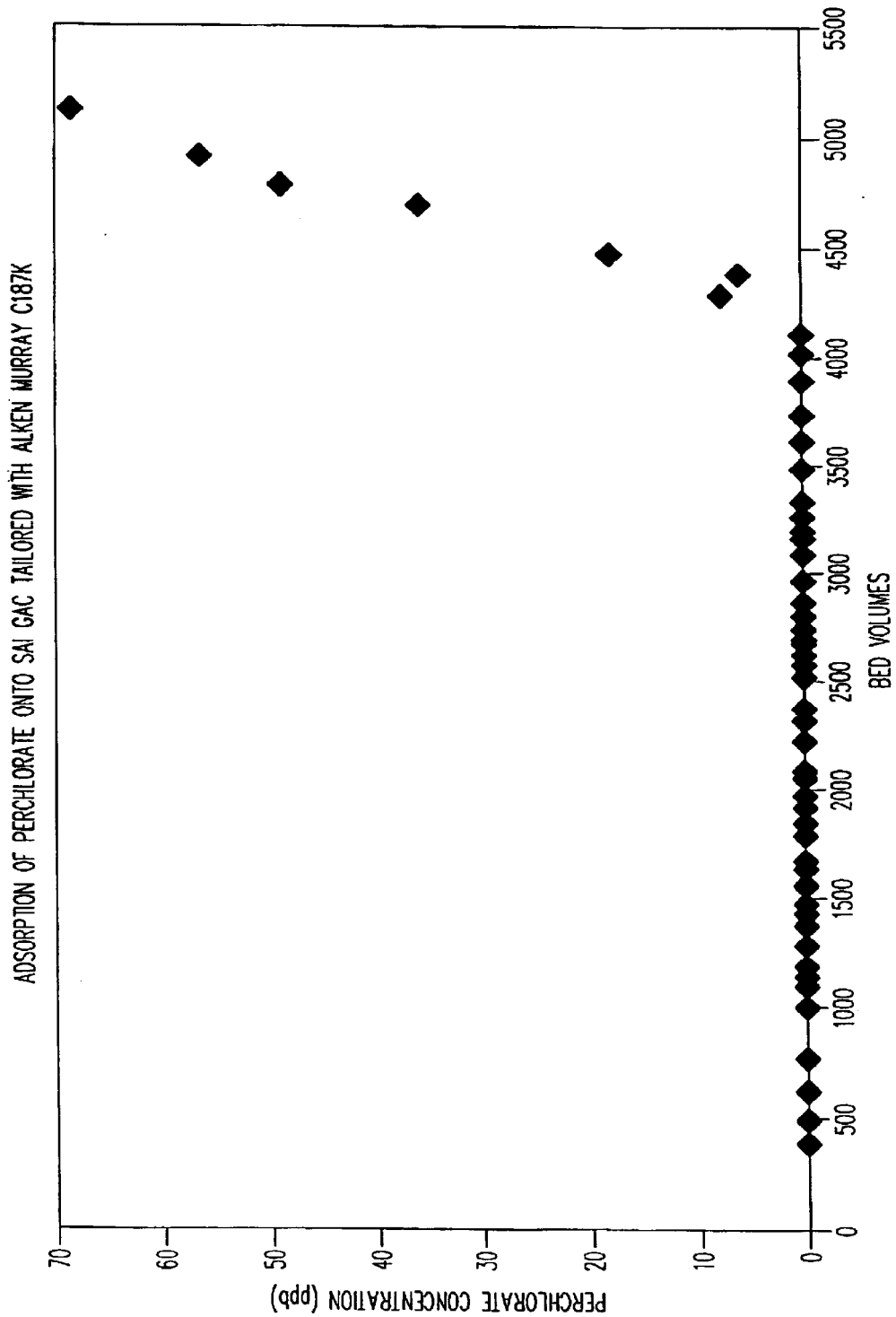
FIG. 11 is a graph plotting perchlorate concentration versus bed volumes for a granular activated carbon (GAC) which has been tailored with cationic polymer according to the present invention.

To extend the time that GAC will remove perchlorate, the GAC was tailored with a cationic polymer. The polymer was recirculated through the column for 2 days. After this time, perchlorate-laden water (approximately 75 ppb) from Redlands, Calif., was passed through the column and the effluent was collected and tested for perchlorate. Perchlorate breakthrough for this column occurred at 4200 bed volumes (breakthrough for virgin GAC occurred after 1200 bed volumes), increasing the time to breakthrough to 3.5 times that of the virgin GAC. The results of this experiment can be seen in FIG. 11.

EXAMPLE 3

Figure 12:
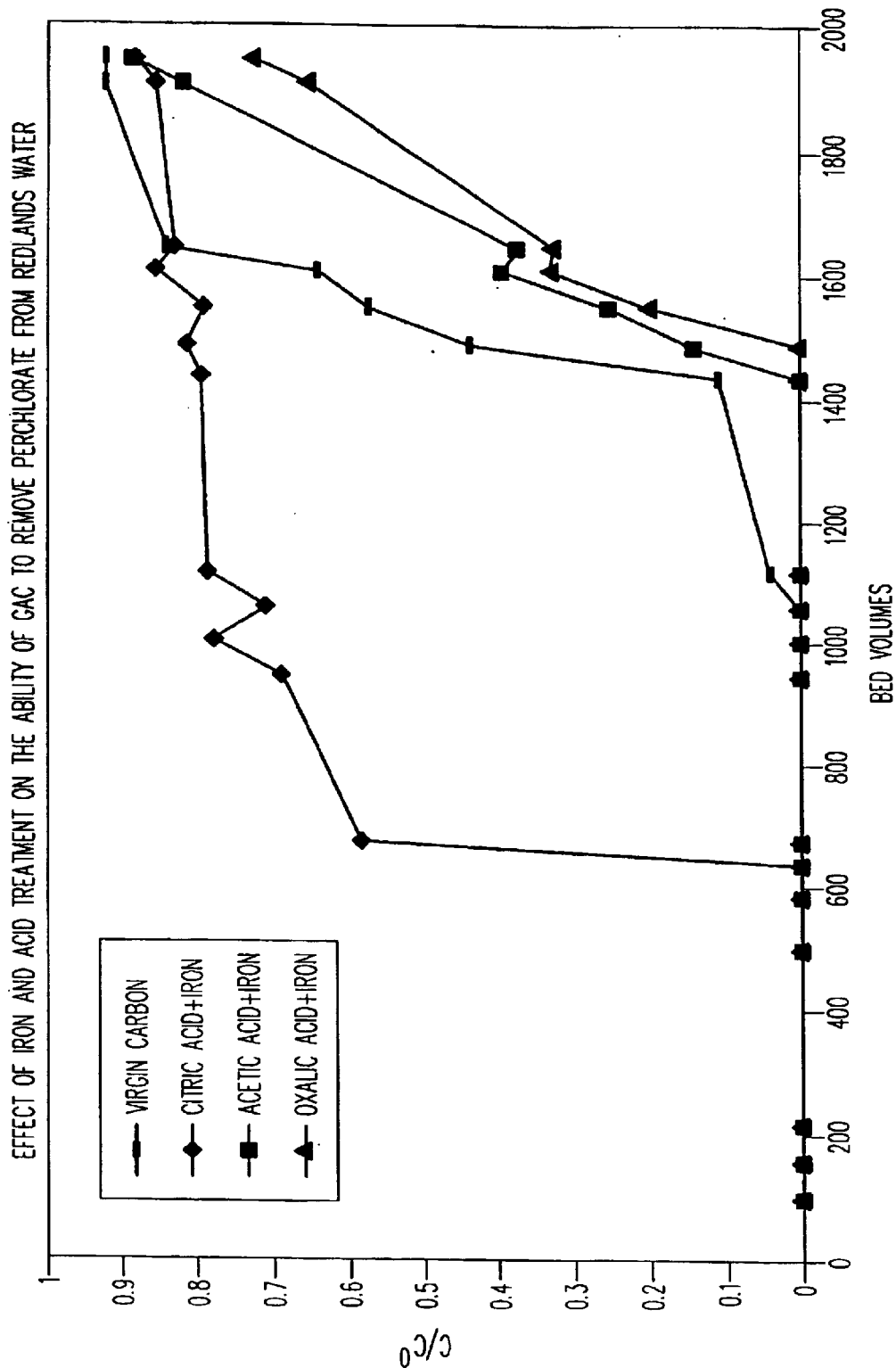
FIG. 12 is a graph demonstrating the effect of ferric salt monomer plus oxalic acid on the ability of GAC to remove perchlorate.

GAC was treated with 100 bed volumes of ferric salt monomer (500 mg/L as Fe) plus 580 mg/L of oxalic acid, acetic acid, or citric acid. A column of virgin carbon was run as a control. Perchlorate laden water (approximately 75 ppb) from Redlands, Calif. was passed through each column and the effluent was collected and measured for perchlorate. The results of these Small-Scale Simulation tests are found in FIG. 12. The column treated with the ferric salt monomer ($FeCl_3$) and acetic acid performed nearly identical to that of the ferric salt monomer and oxalic acid with perchlorate breakthrough at 1500 bed volumes. Both of these preloaded GAC beds performed better than the virgin GAC. Acetic acid is a useful alternative to oxalic acid because acetic acid is a common component in food and this method may be looked upon more favorably than using oxalic acid.

EXAMPLE 4

Figure 13:
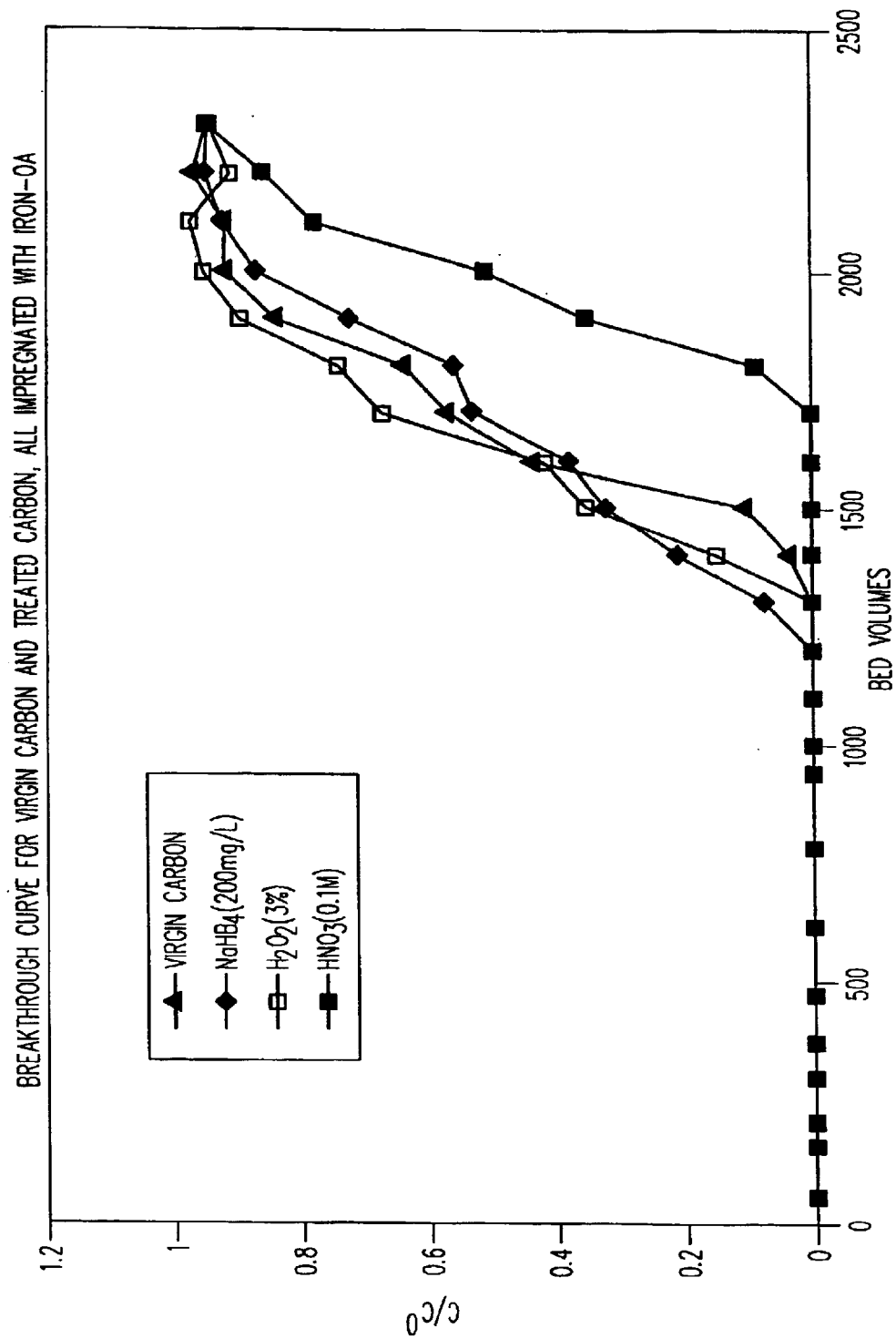
FIG. 13 is a graph demonstrating the breakthrough curve for virgin carbon and treated carbon, all preloaded with ferric salt monomer plusoxalic acid.

The benefits of the ferric salt monomer plus oxalic (or acetic) acid treatment can further be enhanced by first treating the GAC with nitric acid. GAC that had been treated with 0.1 M nitric acid, and then the ferric salt monomer plus oxalic acid commenced perchlorate breakthrough after 1700–1800 BV. These Small-Scale Simulation test results are shown in FIG. 13. This is a 50% increase over the virgin GAC.

EXAMPLE 5

Figure 14:
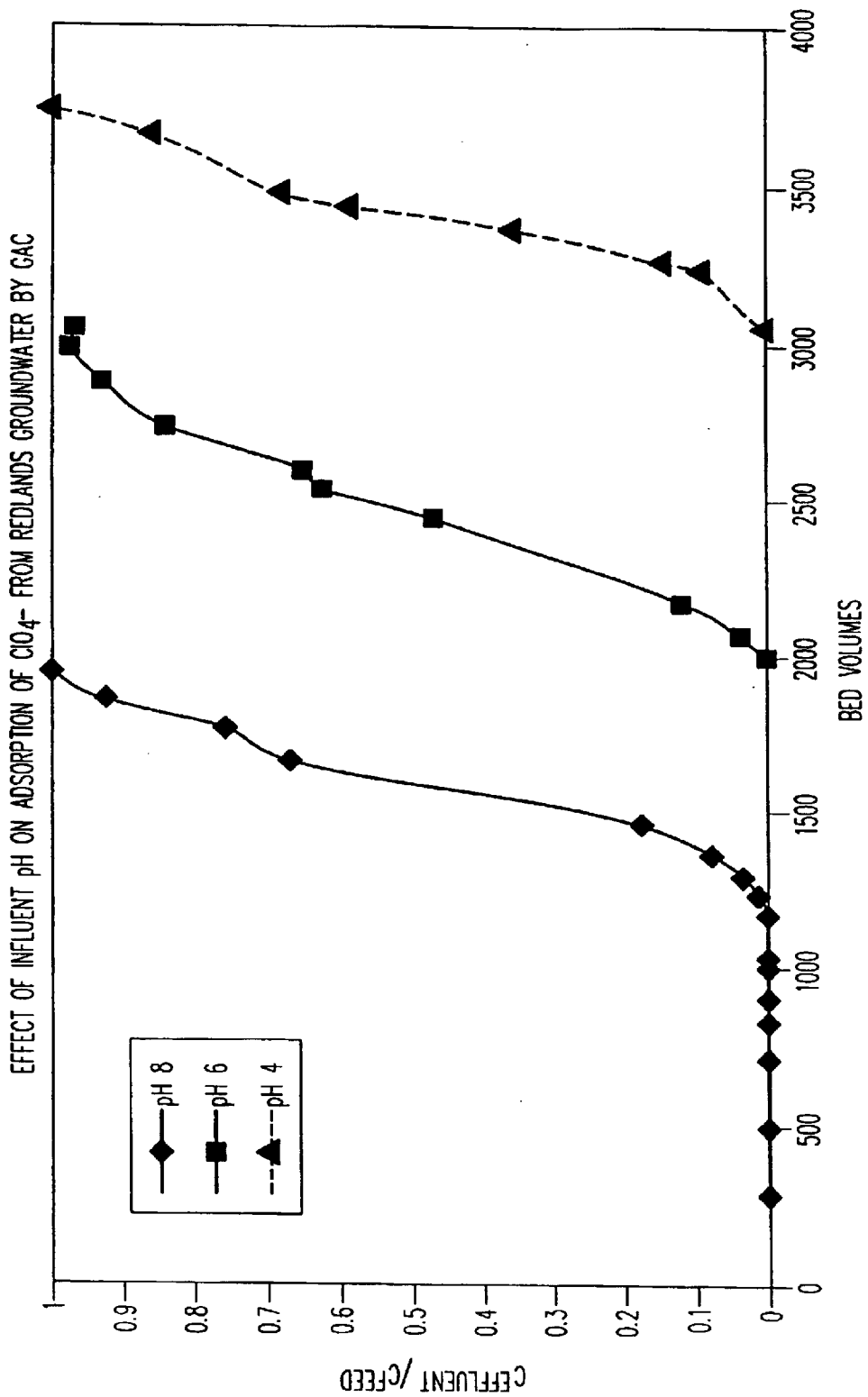
FIG. 14 is a graph demonstrating the effect of influent pH on adsorption of perchlorate.

Lowering of the influent's pH has a large impact on the GAC's capacity for perchlorate. The pH for the ground water from Redlands, Calif. ranges between 7.7 and 8.2. Three Small-Scale Simulation tests were run during this experiment. The first column used normal Redlands ground water (at pH 8), the second column was operated with Redlands ground water adjusted to a pH of 6, and the third column was operated with Redlands ground water adjusted to a pH of 4. As seen in FIG. 14, perchlorate breakthrough occurred at 1200 bed volumes for a pH of 8, 2050 bed volumes for a pH of 6, and 3100 bed volumes for a pH of 4. This increase in capacity with a decrease in pH is likely attributable to the increased surface charge of the GAC at lower pH.

EXAMPLE 6

Figure 14A:
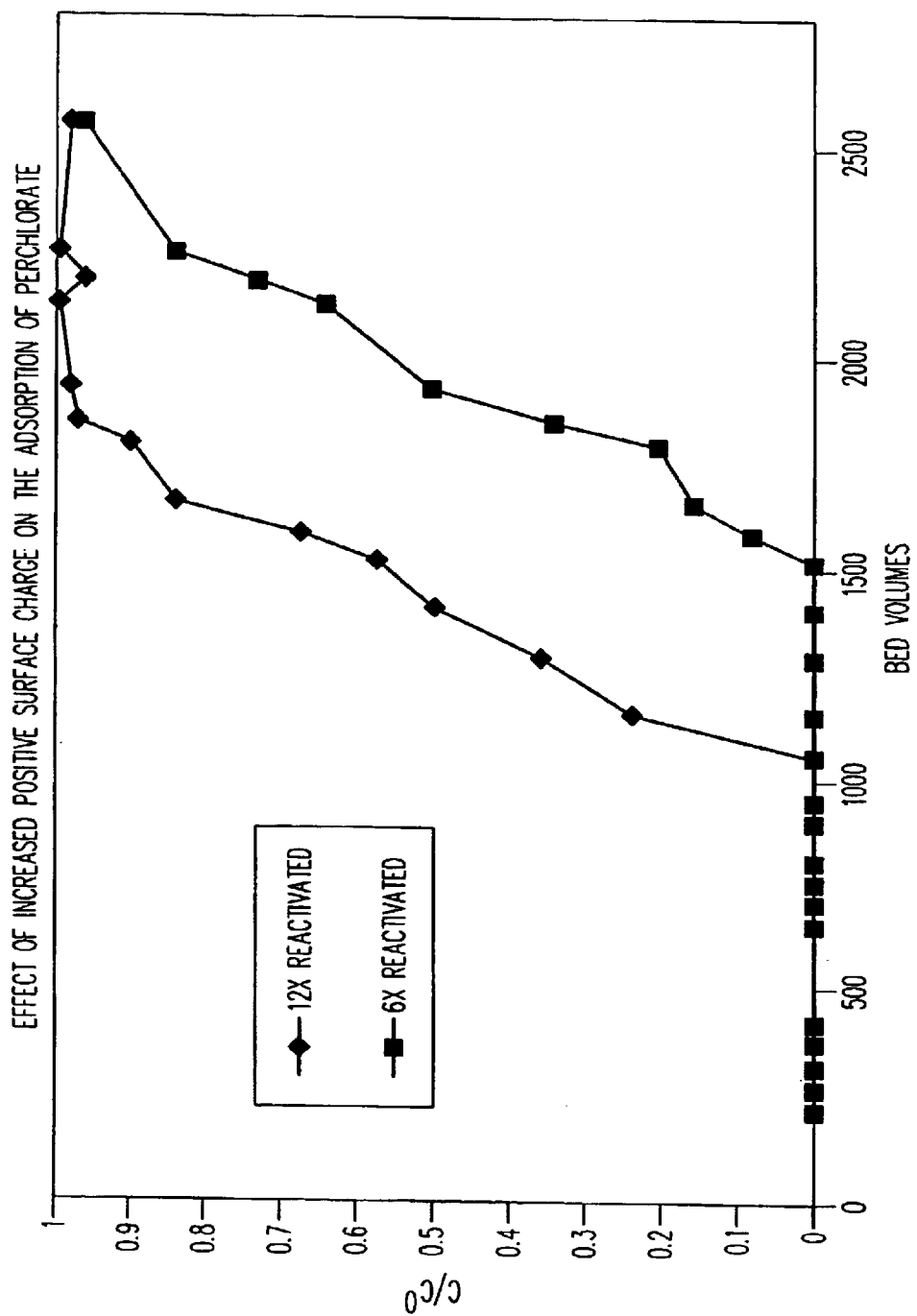
FIG. 14a is a graph demonstrating the effect of increased positive surface charge on the adsorption of perchlorate.

In yet other tests, the present inventors have looked at employing a GAC that had a higher net positive charge than virgin GAC. The net positive charge was measured by a Surface Charge Titration protocol. By increasing the net positive charge, the present inventors have increased the bed volumes to initial perchlorate breakthrough to 1500 bed volumes, as shown in FIG. 14a.

EXAMPLE 7

The GAC capacity for removing perchlorate could also be restored by treating the spent GAC with sodium borohydride, or by treating with a base (such as NaOH) followed by acid (such as HCL), or by treating with thiosulfate followed by acid (such as HCl). These protocols could restore about one-half to three-quarters of the GAC's original capacity for adsorbing perchlorate.

What is claimed is:

1. A method for removing perchlorate from a fluid comprising:
   passing said fluid over an activated carbon material that has been loaded with an organic cation polymer or cationic monomer having thereon functional groups;
   wherein said functional groups on said organic cation polymer or cationic monomer includes at least one selected from the group consisting of: quaternary ammonia, amines, imines, amides, imides, pyrrolic nitrogen, and pyridinic nitrogen; and
   wherein said activated carbon material is selected from the group consisting of: bituminous carbon and lignite carbon.

2. The method according to claim 1, wherein said organic cation polymer or cationic monomer has a molecular weight of less than about 1,000,000 Daltons.

3. The method according to claim 1, wherein said organic cation polymer or cationic monomer has a molecular weight of less than about 500,000 Daltons.

4. The method according to claim 1, wherein said organic cation polymer is at least one polymer selected from the group consisting of: plydiallyldimethlammonium chloride, epichlorohydrin dimethylamine, polyethyleneimine, polyacrylamide, chitosan, polylysine, and diethylaminoethyl-dextran.

5. The method according to claim 1, wherein said cationic monomer is at least one selected from the group consisting of: octyltrimethylammonium bromide or chloride, decyltrimethylammonium bromide or chloride, dodecyltrimethylammonium bromide or chloride, tetradecyltrimethylammonium bromide or chloride, tributylheptylammonium bromide or chloride, ammonium bromide or chloride, diallyidimethlammonium bromide or chloride, acrylamide, domiphen bromide or chloride, tetradecylammonium bromide or chloride, (4-nitrobenzyl)trimethylammonium chloride or bromide, ar-vinylbenzyl)trimethylammonium chloride or bromide, benzoylcholine chloride or bromide, acetylthiochloine iodide or bromide or chloride, methacholine chloride or bromide, betaine hydrochloride, betaine, chlorocholine chloride or bromide, choline chloride or bromide, decamethonium bromide or chloride, hexamethonium bromide or chloride, ferric salt, and ferrous salt.

6. The method according to claim 1, wherein said fluid is water.

7. The method according to claim 1, wherein said cation-loaded activated carbon material is capable of treating said fluid containing at least 50 ppb of said perchlorate, such that said perchlorate is removed from said fluid to an amount of less than 4 ppb for at least about 3,000 bed volumes, in accordance with the Small-Scale Simulation Test protocol.

8. The method according to claim 1, wherein the perchlorate concentration level in said fluid after passing over said activated carbon is about 4 ppb or less.

9. The method according to claim 1, wherein said bituminous carbon and said lignite carbon is microporous or mesoporous.

10. The method according to claim 1, wherein said fluid is ground water.

11. A method for removing perchlorate from a fluid comprising:
   passing said fluid over an activated carbon material that has been loaded with an organic cation polymer or cationic monomer; and
   regenerating said cation-loaded activated carbon material via thermal treatment, whereby said cation-loaded activated carbon material has a bed volume life of at least about 10% of initially treated cation-loaded activated carbon material.

12. A method for removing perchlorate from a fluid comprising:
   passing said fluid over an activated carbon material that has been loaded with an organic cation polymer or cationic monomer; and
   adjusting the pH of said fluid prior to passing over said cation-loaded activated carbon material such that said pH of said fluid is in the range between about 3.0 to 9.0.

13. A method for removing perchlorate from a fluid comprising:
   passing said fluid over a functionalized carbonaceous material, wherein said carbonaceous material is functionalized by treating said carbonaceous material with ammonia or other reduced nitrogen-containing compound at a temperature below about 700° C.;
   wherein said carbonaceous material is selected from the group consisting of: bituminous carbon and lignite carbon.

14. The method according to claim 13, wherein said functional group is at least one selected from the group consisting of: quaternary ammonia, amines, imines, amides, imides, pyrrolic nitrogen, and pyridinic nitrogen.

15. The method according to claim 13, wherein said reduced nitrogen-containing compound is at least one selected from the group consisting of: ammonia, ammonium, quaternary ammonia, urea, and other reduced nitrogen-containing compounds where the valence of the nitrogen-containing compound is below zero.

16. The method according to claim 13, wherein said fluid is water.

17. The method according to claim 13, wherein said functionalized carbonaceous material is capable of treating said fluid containing at least 50 ppb of said perchlorate, such that said perchlorate is removed from said fluid to an amount of less than 4 ppb for at least about 3,000 bed volumes, in accordance with the Small-Scale Simulation Test protocol.

18. The method according to claim 13, wherein the perchlorate concentration level in said fluid after passing over said activated carbon is about 4 ppb or less.

19. A method for removing perchlorate from a fluid comprising:
passing said fluid over a functionalized carbonaceous material, wherein said carbonaceous material is functionalized by treating said carbonaceous material with ammonia or other reduced nitrogen-containing compound at a temperature below about 700° C.; and
regenerating said functionalized carbonaceous material via thermal treatment, whereby said functionalized carbonaceous material has a bed volume life of at least about 10% of initially treated functionalized carbonaceous material.

20. A method for removing perchlorate from a fluid comprising:
passing said fluid over a functionalized carbonaceous material, wherein said carbonaceous material is functionalized by treating said carbonaceous material with ammonia or other reduced nitrogen-containing compound at a temperature below about 700° C.; and
adjusting the pH of said fluid prior to passing over said functionalized activated carbon material such that said pH of said fluid is in the range between about 3.0 to 9.0.

21. A method for removing anionic contaminants from a fluid comprising:
passing said fluid over a functionalized activated carbon material; and
regenerating said functionalized activated carbon material via thermal treatment, whereby said functionalized activated carbon material has a bed volume life of at least about 10% of initially treated functionalized activated carbon material.

22. The method according to claim 21, wherein said activated carbon material is functionalized with nitrogen containing functional groups.

23. The method according to claim 21, wherein said activated carbon material is functionalized by loading with a cationic polymer or cationic monomer.

24. The method according to claim 21, wherein said activated carbon material is functionalized by treating said activated carbon material with ammonia or other nitrogen-containing compound at a temperature below about 700° C.

25. The method according to claim 24, wherein said reduced nitrogen-containing compound is at least one selected from the group consisting of: ammonia, ammonium, quaternary ammonia, urea, and other reduced nitrogen-containing compounds where the valence of the nitrogen-containing compound is below zero.

26. The method according to claim 23, wherein said cationic polymer or cationic monomer has a molecular weight of less than 1,000,000 Daltons.

27. The method according to claim 23, wherein said cationic polymer or cationic monomer has a molecular weight of less than about 500,000 Daltons.

28. The method according to claim 23, wherein said functional group is at least one selected from the group consisting of: quaternary ammonia, amines, imines, amides, imides, pyrrolic nitrogen, and pyridinic nitrogen.

29. The method according to claim 23, wherein said cationic polymer is at least one polymer selected from the group consisting of: plydiallyldimethlammonium chloride, epichlorohydrin dimethylamine, polyethyleneimine, polyacrylamide, chitosan, polylysine and diethylaminoethyl-dextran.

30. The method according to claim 23, wherein said cationic monomer is at least one selected from the group consisting of: octyltrimethylammonium bromide or chloride, decyltrimethylammonium bromide or chloride, dodecyltrimethylammonium bromide or chloride, tetradecyltrimethylammonium bromide or chloride, tributylheptylammonium bromide or chloride, ammonium bromide or chloride, diallyldimethlammonium bromide or chloride, acrylamide, domiphen bromide or chloride, tetradecylammonium bromide or chloride, (4-nitrobenzyl) trimethylammonium chloride or bromide, ar-vinylbenzyl) trimethylammonium chloride or bromide, benzoylcholine chloride or bromide, acetylthiochloine iodide or bromide or chloride, methacholine chloride or bromide, betaine hydrochloride, betaine, chlorocholine chloride or bromide, choline chloride or bromide, decamethonium bromide or chloride, hexamethonium bromide or chloride, ferric salt, and ferrous salt.

31. The method according to claim 21, wherein said fluid is water.

32. The method according to claim 21, wherein said functionalized activated carbon material is capable of treating said fluid containing at least 50 ppb of anionic contaminants, such that said anionic contaminants are removed from said fluid in an amount of less than 4 ppb for at least about 3,000 bed volumes, in accordance with the Small-Scale Simulation Test protocol.

33. The method according to claim 21, wherein the perchlorate concentration level in said fluid after passing over said functionalized activated carbon material is 4 ppb or less.

34. The method according to claim 21, wherein said anionic contaminant is at least one selected from the group consisting of: arsenates, arsenites, nitrates, and chromates.

35. The method according to claim 21, wherein said anionic contaminant is at least one selected from the group consisting of: arsenates, arsenites, nitrates, and chromates.

36. A method for removing anionic contaminants from a fluid comprising:
passing said fluid over a functionalized activated carbon material; and
adjusting the pH of said fluid prior to passing over said functionalized activated carbon material such that said pH of said fluid is in the range between about 3.0 to 9.0.

37. The functionalized activated carbon according to claim 36, wherein said anionic contaminant is at least one selected from the group consisting of:
arsenates, arsenites, nitrates, and chromates.

38. A functionalized activated carbon material which exhibits a positive surface charge greater than about 0.09 milliequivalents/gram, as measured in accordance with the Surface Charge Titration Protocol at a pH of 7.5, provided that it also exhibits a BET surface area greater than 850 $m^2$/g as measured in accordance with the BET Surface Area protocol;
wherein said activated carbon material is functionalized by loading with a cationic polymer or monomer.

39. The functionalized activated carbon material according to claim 38, wherein said cationic polymer has a molecular weight of less than 1,000,000 Daltons.

40. The functionalized activated carbon material according to claim 38, wherein said cationic polymer has a molecular weight of less than about 500,000 Daltons.

41. The functionalized activated carbon material according to claim 38, wherein said cationic polymer is at least one polymer selected from the group consisting of: plydiallyldimethlammonium chloride, epichlorohydrin dimethylamine, polyethyleneimine, polyacrylamide, chitosan, polylysine and diethylaminoethyl-dextran.

42. The functionalized activated carbon material according to claim 38, wherein said cationic monomer is at least one selected from the group consisting of: octyltrimethylammonium bromide or chloride, decyltrimethylammonium bromide or chloride, dodecyltrimethylammonium bromide or chloride, tetradecyltrimethylammonium bromide or chloride, tributylheptylammonium bromide or chloride, ammonium bromide or chloride, diallyidimethlammonium bromide or chloride, acrylamide, domiphen bromide or chloride, tetradecylammonium bromide or chloride, (4-nitrobenzyl)trimethylammonium chloride or bromide, ar-vinylbenzyl)trimethylammonium chloride or bromide, benzoylcholine chloride or bromide, acetylthiochloine iodide or bromide or chloride, methacholine chloride or bromide, betaine hydrochloride, betaine, chlorocholine chloride or bromide, choline chloride or bromide, decamethonium bromide or chloride, hexamethonium bromide or chloride, ferric salt, and ferrous salt.

43. A functionalized activated carbon material which exhibits a positive surface charge greater than about 0.09 milliequivalents/gram, as measured in accordance with the Surface Charge Titration Protocol at a DH of 7.5. Provided that it also exhibits a BET surface area greater than 850 $m^2/q$ as measured in accordance with the BET Surface Area protocol;

wherein said activated carbon material is functionalized with nitrogen containing functional groups.

44. The functionalized activated carbon material according to claim 43, wherein said activated carbon material is functionalized by treating said activated carbon material with reduced nitrogen-containing compounds at a temperature below about 700° C.;

wherein said activated carbon material is selected from the group consisting of: bituminous carbon and lignite carbon.

45. The functionalized activated carbon material according to claim 44, wherein said reduced nitrogen-containing compound is at least one selected from the group consisting of: ammonia, ammonium, quaternary ammonia, urea, and other reduced nitrogen-containing compound where the valence of the nitrogen-containing compound is below zero.

46. The functionalized activated carbon material according to claim 43, wherein said nitrogen containing functional groups include at least one selected from the group consisting of: quaternary ammonia, amines, imines, amides, imides, pyrrolic nitrogen, and pyridinic nitrogen.

47. A functionalized activated carbon material which exhibits a positive surface charge greater than about 0.09 milliequivalents/gram, as measured in accordance with the Surface Charge Titration Protocol at a pH of 7.5; wherein said activated carbon material is functionalized by loading with a cationic polymer or monomer.

48. A method for removing perchlorate from a fluid comprising:

passing said fluid over an activated carbon material that has been loaded with an organic cation polymer or cationic monomer; and regenerating said cation-loaded activated carbon material via thermal treatment, whereby said cation-loaded activated carbon material has a bed volume life of at least about 10% of initially treated cation-loaded activated carbon material;

wherein said functional groups on said organic cation polymer or cationic monomer include at least one selected from the group consisting of: quaternary ammonia, amines, imines, amides, imides, pyrrolic nitrogen, and pyridinic nitrogen;

wherein said activated carbon material is selected from the group consisting of: bituminous carbon and lignite carbon.

49. A method for removing perchlorate from a fluid comprising:

passing said fluid over an activated carbon material that has been loaded with an organic cation polymer or cationic monomer; and adjusting the pH of said fluid prior to passing over said cation-loaded activated carbon material such that said pH of said fluid is in the range between about 3.0 to 9.0;

wherein said functional groups on said organic cation polymer or cationic monomer include at least one selected from the group consisting of: quaternary ammonia, amines, imines, amides, imides, pyrrolic nitrogen, and pyridinic nitrogen;

wherein said activated carbon material is selected from the group consisting of: bituminous carbon and lignite carbon.

50. A method for removing anionic contaminants from a fluid comprising:

passing said fluid over an activated carbon material that has been loaded with an organic cation polymer or cationic monomer having thereon functional groups;

wherein said functional groups on said organic cation polymer or cationic monomer includes at least one selected from the group consisting of: quaternary ammonia, amines, imines, amides, imides, pyrrolic nitrogen, and pyridinic nitrogen; and wherein said activated carbon material is selected from the group consisting of: bituminous carbon and lignite carbon.

* * * * *